United States Patent
Onoue

(10) Patent No.: US 10,819,603 B2
(45) Date of Patent: Oct. 27, 2020

(54) PERFORMANCE EVALUATION METHOD, APPARATUS FOR PERFORMANCE EVALUATION, AND NON-TRANSITORY COMPUTER-READABLE STORAGE MEDIUM FOR STORING PROGRAM

(71) Applicant: FUJITSU LIMITED, Kawasaki-shi, Kanagawa (JP)

(72) Inventor: Koichi Onoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/239,594

(22) Filed: Jan. 4, 2019

(65) Prior Publication Data
US 2019/0245766 A1 Aug. 8, 2019

(30) Foreign Application Priority Data
Feb. 5, 2018 (JP) .................................. 2018-018215

(51) Int. Cl.
*H04L 12/26* (2006.01)
*G06F 11/34* (2006.01)
(Continued)

(52) U.S. Cl.
CPC ...... *H04L 43/0817* (2013.01); *G06F 11/3006* (2013.01); *G06F 11/3419* (2013.01);
(Continued)

(58) Field of Classification Search
CPC ....... H04L 29/08135; H04L 41/04–046; H04L 41/0659–0686; H04L 41/0893–0896;
(Continued)

(56) References Cited

U.S. PATENT DOCUMENTS 10,594,562 B1  3/2020 Rastogi et al.
2008/0022159 A1  1/2008 Kato et al.
(Continued)

FOREIGN PATENT DOCUMENTS

JP  2008-027061    2/2008
JP  2017-138895 A  8/2017

OTHER PUBLICATIONS

U.S. Office Action dated Apr. 17, 2020 for copending U.S. Appl. No. 16/223,171, 22 pages.

*Primary Examiner* — Brendan Y Higa
(74) *Attorney, Agent, or Firm* — Fujitsu Patent Center

(57) ABSTRACT

A performance evaluation method includes: acquiring performance information indicating performance of a service by processes; determining whether the performance information satisfies a performance requirement; acquiring, when the performance information does not satisfy the performance requirement, a first load indicating data reception loads, a second load indicating data transmission loads, and a third load indicating process loads applied due to received data; acquiring, from a memory when the performance of the service satisfies the performance requirement, a first normal load indicating data reception loads, a second normal load indicating data transmission loads, and a third normal load indicating process loads applied due to received data; and outputting a process matching requirements in which the first load is larger than the first normal load, the second load is smaller than the second normal load, and the third load is larger than the third normal load.

12 Claims, 24 Drawing Sheets

(51) Int. Cl.
*H04L 12/24* (2006.01)
*H04L 29/08* (2006.01)
*G06F 11/30* (2006.01)
*H04L 12/813* (2013.01)
*H04L 12/851* (2013.01)

(52) U.S. Cl.
CPC ...... *G06F 11/3452* (2013.01); *G06F 11/3495* (2013.01); *H04L 29/08135* (2013.01); *H04L 41/0659* (2013.01); *H04L 41/0677* (2013.01); *H04L 41/0893* (2013.01); *H04L 41/142* (2013.01); *H04L 41/5009* (2013.01); *H04L 41/5016* (2013.01); *H04L 41/5035* (2013.01); *H04L 43/04* (2013.01); *H04L 43/08* (2013.01); *H04L 43/0876* (2013.01); *H04L 43/16* (2013.01); *H04L 47/20* (2013.01); *H04L 47/24* (2013.01); *H04L 67/10* (2013.01); *G06F 2201/865* (2013.01); *H04L 41/5096* (2013.01); *H04L 43/0852* (2013.01)

(58) Field of Classification Search
CPC ......... H04L 41/14–147; H04L 41/5009–5016; H04L 41/5051; H04L 41/5096; H04L 43/04–0817; H04L 43/0852–50; H04L 67/10; H04L 41/08; H04L 41/0803; H04L 41/0813–0816; H04L 41/5035; H04L 45/44; H04L 45/64; H04L 47/20; H04L 47/24–2441; H04L 67/1074–1076; G06F 9/38; G06F 11/30–301; G06F 11/34; G06F 11/3409; G06F 11/3419; G06F 11/3428; G06F 11/3442; G06F 11/3452; G06F 11/3466; G06F 2201/86–875; G06F 9/5077–5083; G06F 11/079–0793; G06F 11/3433; G06F 2201/81

See application file for complete search history.

(56) References Cited

U.S. PATENT DOCUMENTS

| | | | |
|---|---|---|---|
| 2010/0318986 | A1 | 12/2010 | Burke et al. |
| 2014/0068611 | A1* | 3/2014 | McGrath ............ G06F 9/45533 718/1 |
| 2017/0163742 | A1* | 6/2017 | Chou .................. H04L 41/5012 |
| 2017/0353541 | A1* | 12/2017 | Higashi ............... H04L 67/1031 |
| 2018/0316552 | A1* | 11/2018 | Subrannani Nadar ...................... H04L 41/5054 |
| 2018/0331905 | A1* | 11/2018 | Toledo ................ H04L 41/0886 |

* cited by examiner

FIG. 9

130 NORMAL-STATE BEHAVIOR STORAGE UNIT

131a 131b

TIME INTERVAL (t-1)

TIME INTERVAL (t)

| CONTAINER | METRIC TYPE | PERCENTILE TYPE | PERCENTILE VALUE | WEIGHTED PERCENTILE VALUE |
|---|---|---|---|---|
| $C_{11}$ | CPU UTILIZATION | 50TH PERCENTILE | 14 | 15 |
| | | 90TH PERCENTILE | 72 | 71 |
| | | 99TH PERCENTILE | 91 | 90 |
| | I/O RATE OF MEMORY | 50TH PERCENTILE | 12 | 13 |
| | | 90TH PERCENTILE | 86 | 85 |
| | | 99TH PERCENTILE | 99 | 98 |
| | TRANSMISSION AND RECEPTION RATE OF NETWORK | 50TH PERCENTILE | 15 | 16 |
| | | 90TH PERCENTILE | 73 | 74 |
| | | 99TH PERCENTILE | 98 | 97 |
| ... | ... | ... | ... | ... |

132a 132b

TIME INTERVAL (t-1)

TIME INTERVAL (t)

| CONTAINER | METRIC TYPE | PERCENTILE TYPE | PERCENTILE VALUE | WEIGHTED PERCENTILE VALUE |
|---|---|---|---|---|
| SERVER 1 | CPU UTILIZATION | 50TH PERCENTILE | 15 | 16 |
| | | 90TH PERCENTILE | 66 | 65 |
| | | 99TH PERCENTILE | 96 | 92 |
| | I/O RATE OF MEMORY | 50TH PERCENTILE | 12 | 14 |
| | | 90TH PERCENTILE | 79 | 83 |
| | | 99TH PERCENTILE | 98 | 97 |
| | TRANSMISSION AND RECEPTION RATE OF NETWORK | 50TH PERCENTILE | 15 | 12 |
| | | 90TH PERCENTILE | 70 | 64 |
| | | 99TH PERCENTILE | 96 | 99 |
| ... | ... | ... | ... | ... |

FIG. 16
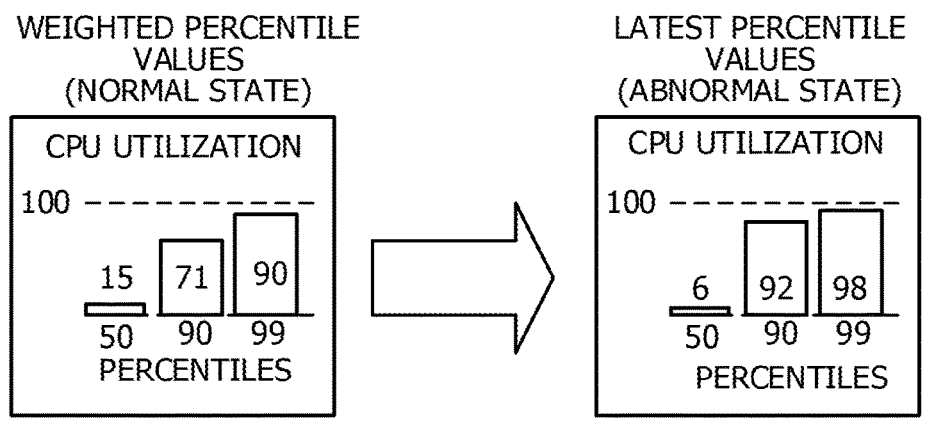
POSITIVE FACTOR DEGREE $F_+ = \Sigma$(INCREASE IN P OF P-TH PERCENTILE WHOSE VALUE INCREASES)×(DIFFERENCE BETWEEN PERCENTILE VALUES)
NEGATIVE FACTOR DEGREE $F_- = \Sigma$(INCREASE IN P OF P-TH PERCENTILE WHOSE VALUE DECREASES)×(DIFFERENCE BETWEEN VALUE OF PERCENTILES)
POSITIVE FACTOR DEGREE $F_+ = (90 - 50)\times(92 - 71) + (99 - 90)\times(98 - 90) = 912$
NEGATIVE FACTOR DEGREE $F_- = 50\times(15 - 6) = 450$

FIG. 17

| CONTAINER $C_{11}$ | | |
|---|---|---|
| METRIC TYPE | POSITIVE FACTOR DEGREE | NEGATIVE FACTOR DEGREE |
| CPU UTILIZATION | 912 ($F_+[CPU(C_{11})]$) | 450 ($F_-[CPU(C_{11})]$) |
| I/O RATE OF MEMORY | 685 ($F_+[memory(C_{11})]$) | 532 ($F_-[CPU(C_{11})]$) |
| TRANSMISSION AND RECEPTION RATE OF NETWORK | 457 ($F_+[network(C_{11})]$) | 235 ($F_-[network(C_{11})]$) |

$|F_+[CPU(C_{11})]| > |F_+[network(C_{21})]| > |F_+[CPU(C_{22})]| > |F_-[CPU(C_{22})]| > ...$

⇩

FACTOR COMPONENT: COMPONENT 1
FACTOR METRIC: CPU UTILIZATION
CONTAINER FACTOR DEGREE CODE: POSITIVE
CONTAINER EXECUTING SERVER: SERVER 1

⇧

141

| SERVER NAME | CONTAINER NAME |
|---|---|
| SERVER 1 | $C_{11}, C_{22}, C_{31}$ |
| SERVER 2 | $C_{12}, C_{32}, C_{41}$ |
| ... | ... |

FIG. 19

| SERVER 1 | | | |
|---|---|---|---|
| METRIC TYPE | POSITIVE FACTOR DEGREE | NEGATIVE FACTOR DEGREE | FACTOR DEGREE CODE |
| CPU UTILIZATION | 765 | 435 | POSITIVE |
| NETWORK RECEPTION RATE | 265 | 521 | NEGATIVE |
| NETWORK TRANSMISSION RATE | 567 | 326 | POSITIVE |

FACTOR METRIC: CPU UTILIZATION
CONTAINER EXECUTING SERVER: SERVER 1

SERVER FACTOR DEGREE CODE: POSITIVE

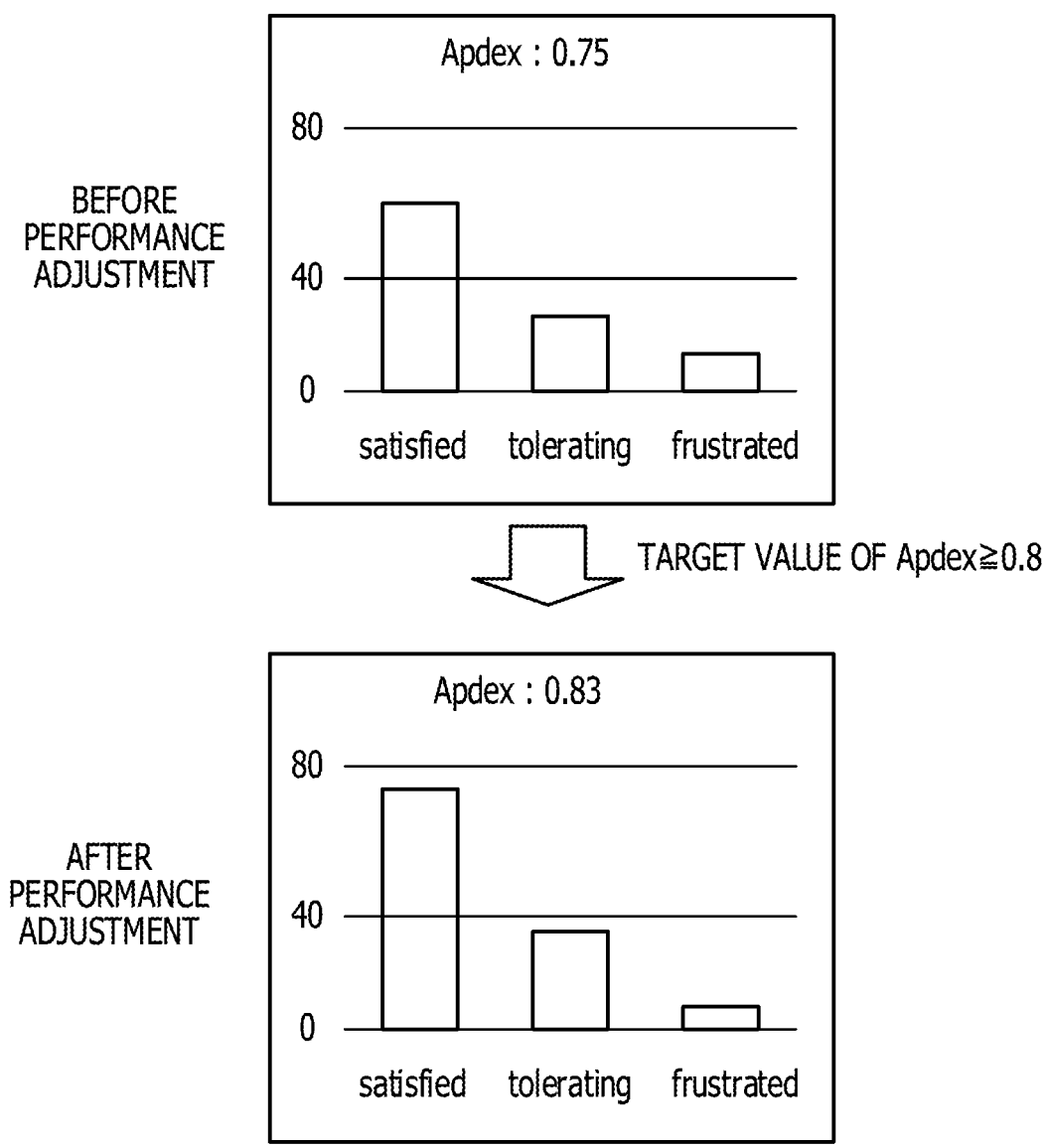

PERFORMANCE EVALUATION METHOD, APPARATUS FOR PERFORMANCE EVALUATION, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-18215, filed on Feb. 5, 2018, the entire contents of which are incorporated herein by reference.

FIELD

The embodiments discussed herein are related to a performance evaluation method, apparatus for performance evaluation, and a non-transitory computer-readable storage medium for storing a program for a performance evaluation processing.

BACKGROUND

Cloud computing techniques make it easy to provide computer resources with amounts requested by a user to the user via a network. Cloud computing includes Platform as a Service (PaaS) that provides, via a network to a user, an environment for the use of a platform for the execution of application software (hereinafter referred to as application), for example.

A service that is provided using PaaS may be built based on a technical idea that is referred to as microservices architecture. In the microservices architecture, software for providing a single service is generated so that the software is divided into multiple small applications that are referred to as components. By synthesizing multiple components with each other to provide a single service, processing power may be increased on a component basis. Thus, when a process load of a certain component is excessively high, it is sufficient if processing power of the certain component is increased, and processing power of the other components is not changed.

Execution units of the components are referred to as containers. To increase processing power of a component, an administrator increases the number of containers for the component for which the processing power is to be increased (scale out process). Since the number of containers is increased or reduced to adjust performance of a service, system resources may be efficiently consumed. A PaaS system using such containers is referred to as container-based PaaS platform.

An administrator of a cloud computing system adjusts performance of components for enabling a service to maintain the quality of the service. For example, the administrator determines the maximum value of latency in order to provide the service. When the latency of the service exceeds the maximum value, the administrator increases processing power for the execution of the components used to provide the service.

As a technique for managing the system, there is a technique for efficiently detecting an information processing device with an abnormality from an information processing system including multiple information processing devices, for example.

An example of related art is Japanese Laid-open Patent Publication No. 2008-027061.

SUMMARY

According to an aspect of the embodiments, a performance evaluation method includes: executing a first process that includes acquiring performance information indicating performance of a service provided by causing multiple processes to coordinate with each other; executing a second process that includes determining whether or not the performance information satisfies a performance requirement indicating performance requested for the service; executing a third process that includes acquiring first latest load values indicating data reception loads of the multiple processes in a latest predetermined time period, second latest load values indicating data transmission loads of the multiple processes in the latest predetermined time period, and third latest load values indicating process loads, applied due to received data, of the multiple processes in the latest predetermined time period when the performance information does not satisfy the performance requirement; executing a fourth process that includes acquiring, from a memory, first normal load values indicating data reception loads of the multiple processes, second normal load values indicating data transmission loads of the multiple processes, and third normal load values indicating process loads, applied due to received data, of the multiple processes when the performance of the service satisfies the performance requirement; and executing a fifth process that includes outputting, as a factor causing a decrease in the performance of the service, the name of a process matching requirements in which a first latest load value is larger than a first normal load value, a second latest load value is smaller than a second normal load value, and a third latest load value is larger than a third normal load value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of information stored in a normal-state behavior storage unit;

FIG. 16 is a diagram illustrating an example of the calculation of factor degrees;

FIG. 17 is a diagram illustrating an example of the identification of a maximum factor degree component;

FIG. 19 is a diagram illustrating an example of the determination of a server factor degree code;

FIG. 21 is a diagram illustrating an example of results of performance adjustment;

DESCRIPTION OF EMBODIMENTS

In a microservices architecture, even when latency of a service exceeds the maximum value of the latency, a component causing a decrease in performance may not be found among multiple components used for the service not satisfying a performance requirement. Especially, in PaaS, a user of PaaS generates components and a system administrator may not recognize specific details of processes of the components. It is, therefore, difficult for the system administrator to appropriately identify the component causing the decrease in the performance.

A problem with the difficulty in identifying a process causing a decrease in performance may occur in not only a service generated based on the microservices architecture but also when performance of a service provided by coordinating multiple processes with each other is adjusted.

According to an aspect, the present disclosure aims to identify a process causing a decrease in performance.

Hereinafter, embodiments are described with reference to the accompanying drawings. Two or more of the embodiments may be combined without any contradiction.

First Embodiment

First, a first embodiment is described below.

Figure 1:
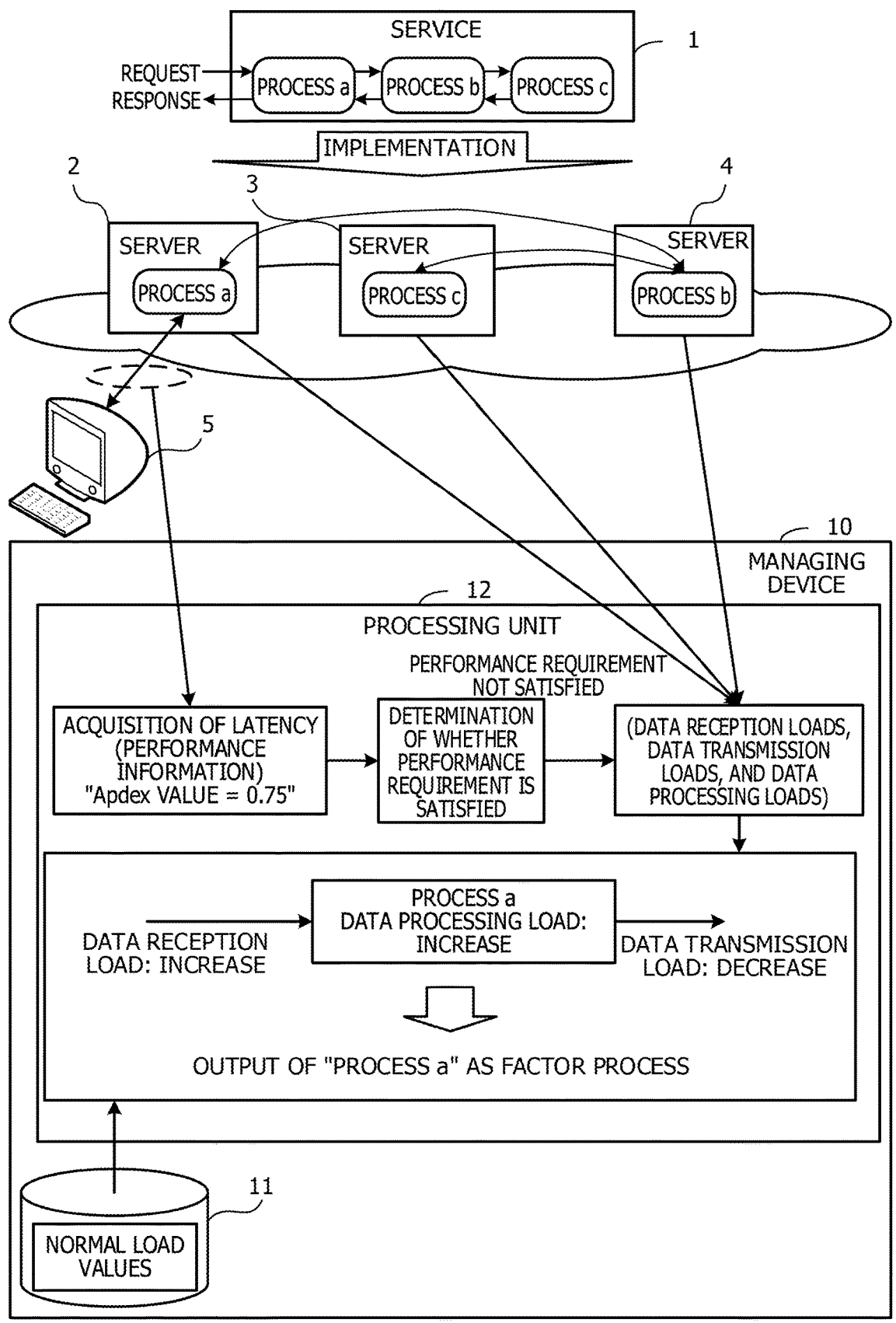
FIG. 1 is a diagram illustrating an example of a configuration of a system according to a first embodiment.

FIG. 1 is a diagram illustrating an example of a configuration of a system according to a first embodiment. A service 1 provided by executing multiple processes ("process a", "process b", and "process c") and causing the multiple processes to coordinate with each other is implemented in multiple servers 2 to 4. For example, the "process a" is executed in the server 2, the "process c" is executed in the server 3, and the "process b" is executed in the server 4.

For example, a request for the service 1 is input to the server 2 from a terminal device 5. The server 2 transmits a request for the "process b" to the server 4 during the execution of the "process a". Then, the server 4 executes the "process b". The server 4 transmits a request for the "process c" to the server 3 during the execution of the "process b". Then, the server 3 executes the "process c". The server 3 transmits results of the "process c" to the server 4. The server 4 uses the results of the "process c" to execute the "process b" and transmits results of the "process b" to the server 2. The server 2 uses the results of the "process b" to execute the "process a" and transmits, to the terminal device 5, results of the "process a" as a response to the request from the terminal device 5.

A managing server 10 manages the service 1 provided by the servers 2 to 4. For example, the managing device 10 adjusts performance of the service 1. For example, when the performance of the service 1 decreases, the managing device 10 identifies a process causing the decrease in the performance of the service 1. Then, the managing device 10 controls the processes executed by the servers 2 to 4 so as to resolve the decrease in the performance.

The difficulty in identifying the process causing the decrease in the performance of the service 1 is described below.

As a first method of identifying a factor causing the decrease in the performance, it is considered that a certain process, which is among the processes used to provide the service 1 and of which a load in a state in which the performance decreases (in an abnormal state) increases by the maximum level from a load of the certain process in a state in which the performance does not decreases (in a normal state), is treated as the factor causing the decrease in the performance. As values of loads of the processes, measured values indicating operation states of resources, such as central processing unit (CPU) utilization upon the execution of the processes, may be used.

In the first method, when the speed of a process used for the service 1 decreases due to another process executed in a certain server executing the process used for the service 1, and the performance of the service 1 decreases, the factor causing the decrease in the performance may not be identified. For example, when an amount processed by the other process executed by the same certain server is excessive, and processing power of the server reaches a limit, CPU utilization by the process used to provide the service 1 decreases and the efficiency of the process decreases. As a result, the performance of the service 1 decreases. However, since the CPU utilization by the process used to provide the service 1 is not higher than that in the normal state, a process causing the decrease in the performance may not be appropriately identified in the first method.

As a second method of identifying the factor causing the decrease in the performance, it is considered that a process in which the difference between a process load in the normal state and a process load in an abnormal state is the largest among the processes is treated as the factor causing the decrease in the performance of the service 1. In the second method, when CPU utilization by the process used to provide the service 1 significantly decreases due to another process executed in the same server executing the process used to provide the service 1, the process is identified as the factor causing the decrease in the performance of the service 1. In this case, the factor causing the decrease in the performance may be more appropriately identified by adding a requirement in which the load of the server executing the process used for the service 1 upon a decrease in the performance of the service 1 is higher than that in the normal state.

In the second method, however, a process causing the decrease in the performance may not be appropriately identified. For example, as a result of the insufficiency of the performance of a calling process, data to be processed may not be transmitted to a called process and a load of the called process may decrease. In this case, CPU utilization by the called process is lower than that in the normal state, but the called process is not the factor causing the decrease in the performance of the service 1. Thus, it is not easy to identify a process causing a decrease in the performance of the service 1.

The managing device 10 enables a performance management method of appropriately identifying a process causing a decrease in the performance based on execution states of the processes in the servers 2 to 4. Thus, the managing device 10 includes a storage unit 11 and a processing unit 12. The storage unit 11 is, for example, a memory or a storage device. The processing unit 12 is, for example, one or multiple processors. A process to be executed by the processing unit 12 may be enabled by causing the one or multiple processors to execute a performance evaluation program in which a procedure for the process is described.

The storage unit 11 is configured to store information (normal-state load values) indicating execution states of the multiple processes when the performance of the service 1 satisfies the performance requirement. The information indicating the execution states of the multiple processes are first normal load values indicating data reception loads of the multiple processes, second normal load values indicating data transmission loads of the multiple processes, and third normal load values indicating process loads, applied due to received data, of the multiple processes. The first normal load values are amounts of data received per unit time period in the normal state, for example. The second normal load values are amounts of data transmitted per unit time period in the normal state, for example. The third normal load values are CPU utilization, memory utilization in the normal state, or the like and are measured values that vary depending on amounts of processed data. The storage unit 11 may store multiple measured values as each of the third normal load values.

The processing unit 12 acquires performance information indicating the performance of the service 1 provided by causing the multiple processes to coordinate with each other. For example, the processing unit 12 monitors communication between the terminal device 5 and the server 2 and acquires a time period (latency) from the reception of the request to the transmission of the response. The processing unit 12 calculates an index value of the performance based on latency for multiple requests. The index value is, for example, an application performance index (Apdex). Apdex is described later.

The processing unit 12 determines whether or not the acquired performance information satisfies a performance requirement. For example, the performance requirement indicates that Apdex is equal to or larger than 0.8. In this case, the processing unit 12 determines whether or not the Apdex value calculated based on the acquired performance information is equal to or larger than 0.8.

When the acquired performance information does not satisfy the performance requirement, the processing unit 12 acquires, from the servers 2 to 4, information (latest load values) indicating execution states of the multiple processes in the servers 2 to 4 in a latest predetermined time period. For example, the information indicating the execution states is first latest load values indicating data reception loads of the multiple processes, second latest load values indicating data transmission loads of the multiple processes, and third latest load values indicating process loads, applied due to received data, of the multiple processes. The first latest load values are amounts of data received in the latest unit time period, for example. The second latest load values are amounts of data transmitted in the latest unit time period, for example. The third latest load values are CPU utilization, memory utilization, or the like and are measured in the latest time period and vary depending on amounts of processed data. The processing unit 12 may acquire multiple measured values as each of the third latest load values.

Next, the processing unit 12 acquires, from the storage unit 11, the normal load values (first normal load values, second normal load values, and third normal load values) of the multiple processes.

Then, the processing unit 12 outputs, as the factor causing the decrease in the performance of the service 1, the name of a process matching requirements in which a first latest load value is larger than a first normal load value, a second latest load value is smaller than a second normal load value, and a third latest load value is larger than a third normal value. When the processing unit 12 acquires multiple third latest load values and multiple third normal load values for each of the processes, the processing unit 12 compares third latest load values with third normal values for resources of the same type. When a third latest load value is larger than a third normal load value for one or more resources of a certain process, the processing unit 12 determines that third latest load values are larger than third normal load values for the process.

The processing unit 12 may determine a process (hereinafter referred to as maximum load difference process in some cases) in which the difference between a latest process load and a process load in the normal state is the largest among the multiple processes. When the load of the maximum load difference process in the normal state is larger than the latest load of the maximum load difference process, the processing unit 12 may output the name of the process matching the requirements. In addition, when the latest load of the maximum load difference process is larger than the load of the maximum load difference process in the normal state, the processing unit 12 may output the name of the maximum load difference process as the factor causing the decrease in the performance of the service 1.

A process that causes the decrease in the performance of the service 1 may not be identified. In this case, when the load of the maximum load difference process in the normal state is larger than the latest load of the maximum load difference process, a process matching the requirements does not exist, and a load of a server executing the maximum load difference process when the performance of the service 1 does not satisfy the performance requirement is larger than a load of the server executing the maximum load difference process when the performance of the service 1 satisfies the performance requirement, the processing unit 12 outputs the name of the server as the factor causing the decrease in the performance of the service 1.

In the aforementioned manner, the managing device 10 may appropriately determine a process causing a decrease in the performance among the processes used to provide the service 1. The managing device 10 may appropriately identify, as the factor causing the decrease in the performance of the service 1, a process unable to process data due to an increase in the amount of the data to be processed and may output the name of the process. As a result, an administrator may confirm the output process name, perform a scale out operation on the process causing the decrease in the performance, and quickly handle the factor causing the decrease in the performance of the service 1. In addition, the managing device 10 may control the servers 2 to 4 and automatically execute scale out on the process with the output process name.

When a server name is output as the factor causing the decrease in the performance, the administrator instructs a process used to provide the service 1 to migrate a function so that the process is executed by a server other than the server causing the decrease in the performance.

Second Embodiment

Next, a second embodiment is described. The second embodiment describes a computer system configured to appropriately determine a component causing an excessive load when the latency of the service exceeds the maximum value in the case where an operation of PaaS built based on a microservices architecture is managed.

In a state in which the performance of the service based on the microservices architecture decreases, when a certain component of which a load significantly decreases to a value lower than that in the normal state exists, a factor causing the decrease in the performance is likely to be a component other than the certain component. For example, it is considered that an amount to be processed by a component that transmits a request to execute a process to the component of which the load decreases becomes excessive and the process slows down.

In this case, if the order that components used to provide the service are called is recognized, a component causing the decrease in the performance of the service may be found by tracing a source of calling the component of which the load significantly decreases. In PaaS, however, the administrator may not easily recognize the order that the components used to provide the service are called.

For example, when source codes of components are modified so that a calling source is traced, the administrator may recognize calling relationships between the components. In PaaS, however, source programs of the components are managed by a PaaS user, and the administrator of PaaS may not rewrite the source programs.

The calling relationships between the components may be recognized by acquiring and analyzing communication using a virtual switch connected to containers. However, if a function of acquiring and analyzing the communication is introduced in the system, the performance of the components significantly decreases.

It is actually difficult for the administrator of PaaS to recognize the order that the components used to provide the service are called.

In the second embodiment, a managing server compares execution states of components when the performance of the service satisfies the performance requirement with execution states of the components when the performance of the service does not satisfy the performance requirement, and analyzes the execution states. Then, the managing server appropriately determines a component causing a decrease in the performance of the service based on the results of the analysis. For example, the managing server determines, as a factor causing the decrease in the performance of the service, a component unable to process data due to an increase in the amount of the data to be processed in the component.

Figure 2:
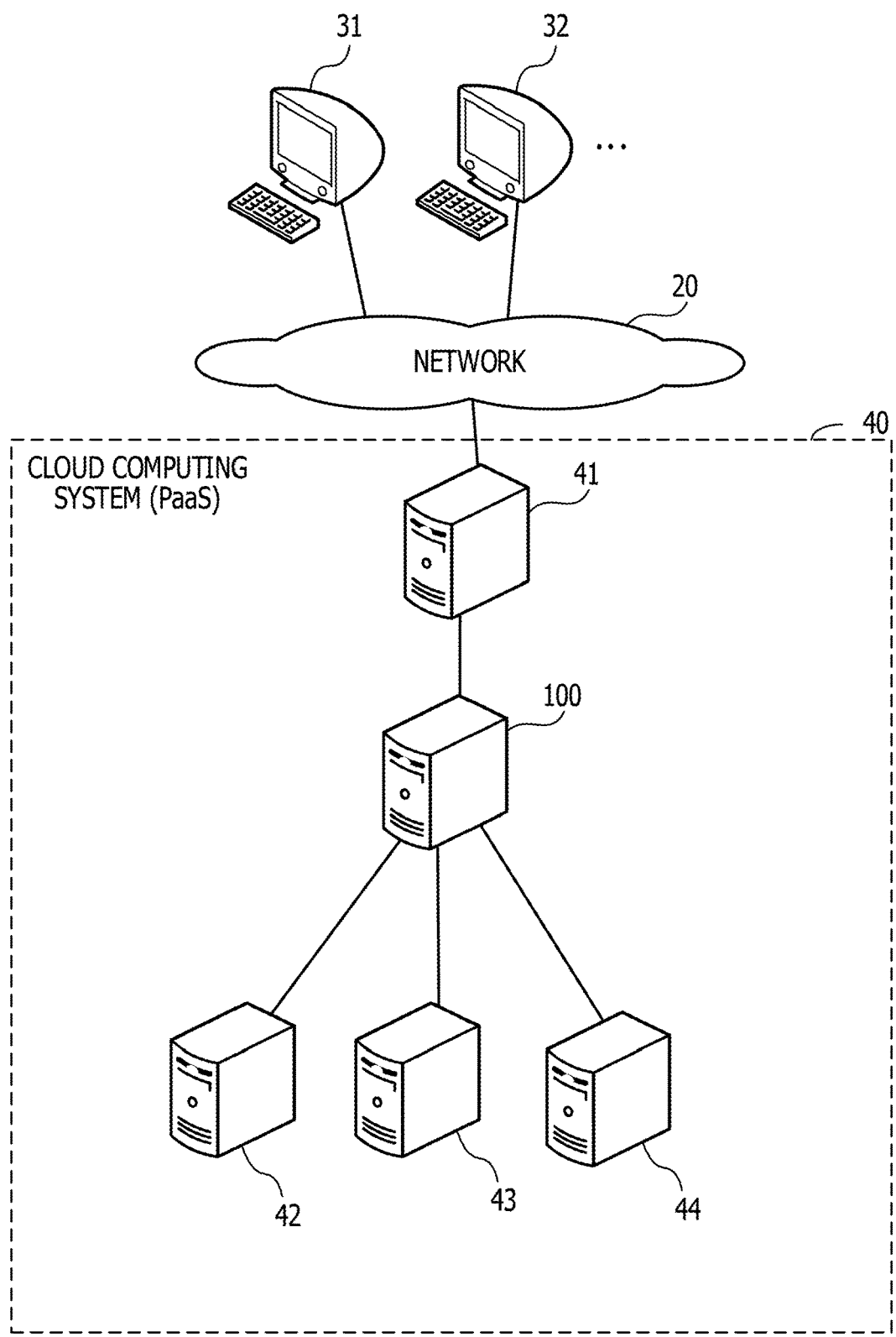
FIG. 2 is a diagram illustrating an example of a configuration of a system according to a second embodiment.

FIG. 2 illustrates an example of a configuration of the system according to the second embodiment. A cloud computing system 40 is connected to multiple terminal devices 31, 32, . . . via a network 20. The cloud computing system 40 provides a service based on PaaS to the terminal devices 31, 32, . . . .

The cloud computing system 40 includes a gateway 41, a managing server 100, and multiple servers 42 to 44. The gateway 41 is connected to the network 20 and configured to receive requests from the terminal devices 31, 32, . . . . The managing server 100 is connected to the gateway 41 and the multiple servers 42 to 44 and configured to manage the multiple servers 42 to 44. The multiple servers 42 to 44 are configured to provide an information processing service in accordance with requests from the terminal devices 31, 32, . . . .

Figure 3:
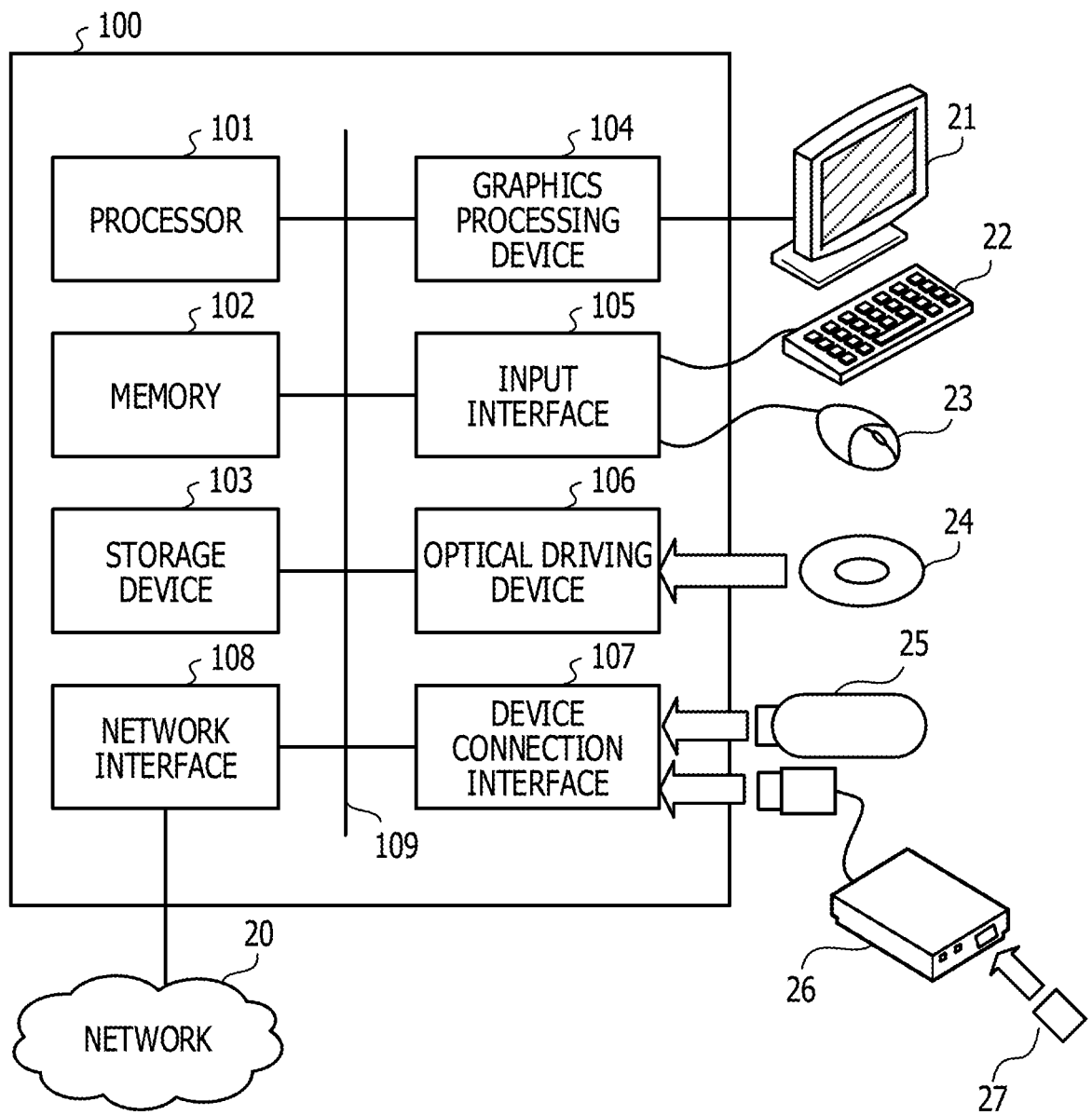
FIG. 3 is a diagram illustrating an example of a hardware configuration of a managing server.

FIG. 3 is a diagram illustrating an example of a hardware configuration of the managing server. The entire managing server 100 is controlled by a processor 101. The processor 101 is connected to a memory 102 and multiple peripheral devices via a bus 109. The processor 101 may be a multi-processor. The processor 101 is, for example, a central processing unit (CPU), a micro processing unit (MPU), or a digital signal processor (DSP). One or more of functions to be enabled by causing the processor 101 to execute a program may be enabled by an electronic circuit such as an application specific integrated circuit (ASIC) or a programmable logic device (PLD).

The memory 102 is used as a main storage device of the managing server 100. In the memory 102, either or both of an operating system (OS) program to be executed by the processor 101 and an application program to be executed by the processor 101 is or are temporarily stored. In the memory 102, data of various types that is used for a process to be executed by the processor 101 is stored. As the memory 102, a volatile semiconductor storage device such as a random access memory (RAM) is used.

Examples of the peripheral devices connected to the bus 109 are a storage device 103, a graphics processing device 104, an input interface 105, an optical driving device 106, a device connection interface 107, and a network interface 108.

The storage device 103 electrically or magnetically writes and reads data to and from a recording medium included in the storage device 103. The storage device 103 is used as an auxiliary storage device of the managing server 100. In the storage device 103, the OS program, the application program, and the data of the various types are stored. As the storage device 103, a hard disk drive (HDD) or a solid state drive (SSD) may be used.

The graphics processing device 104 is connected to a monitor 21. The graphics processing device 104 causes an image to be displayed on a screen of the monitor 21 in accordance with a command from the processor 101. Examples of the monitor 21 are a display device having a cathode ray tube (CRT), a liquid crystal display, and an organic electroluminescence (EL) display device.

The input interface 105 is connected to a keyboard 22 and a mouse 23. The input interface 105 transmits signals received from the keyboard 22 and the mouse 23 to the processor 101. The mouse 23 is an example of a pointing device. Another pointing device may be used instead of the mouse 23. The other pointing device is a touch panel, a tablet, a touch pad, a trackball, or the like.

The optical driving device 106 uses laser light or the like to read data recorded in an optical disc 24. The optical disc 24 is a portable recording medium for storing data readable by light reflection. Examples of the optical disc 24 are a digital versatile disc (DVD), a DVD-ROM, a compact disc read only memory (CD-ROM), a compact disc-recordable (CD-R), and a compact disc-rewritable (CD-RW).

The device connection interface 107 is a communication interface configured to connect the peripheral devices to the managing server 100. For example, a memory device 25 and a memory reader and writer 26 may be connected to the device connection interface 107. The memory device 25 is a recording medium having a function of communicating with the device connection interface 107. The memory reader and writer 26 is a device configured to write data to a memory card 27 and read data from the memory card 27. The memory card 27 is a card-type recording medium.

The network interface 108 is connected to the network 20. The network interface 108 transmits and receives data to and from another computer or a communication device via the network 20.

Processing functions of the managing server 100 according to the second embodiment may be enabled by the aforementioned hardware configuration. The terminal devices 31, 32, . . . , the gateway 41, and the servers 42 to 44 may be enabled by the same hardware as the managing server 100. The managing device 10 described in the first embodiment may be enabled by the same hardware as the managing server 100 illustrated in FIG. 3.

The managing server 100 enables the processing functions according to the second embodiment by executing a program stored in a computer-readable recording medium, for example. The program in which details of processes to be executed by the managing server 100 are described may be recorded in various recording media. For example, the program to be executed by the managing server 100 may be stored in the storage device 103. The processor 101 loads the entire program stored in the storage device 103 or a portion of the program stored in the storage device 103 into the memory 102 and executes the program. The program to be executed by the managing server 100 may be recorded in a portable recording medium such as the optical disc 24, the memory device 25, or the memory card 27. The program stored in the portable recording medium may be installed in the storage device 103 and executed under control by the processor 101. The processor 101 may read the program directly from the portable recording medium and execute the program.

In the second embodiment, software for providing a service based on the microservices architecture is implemented in the servers 42 to 44.

Figure 4:
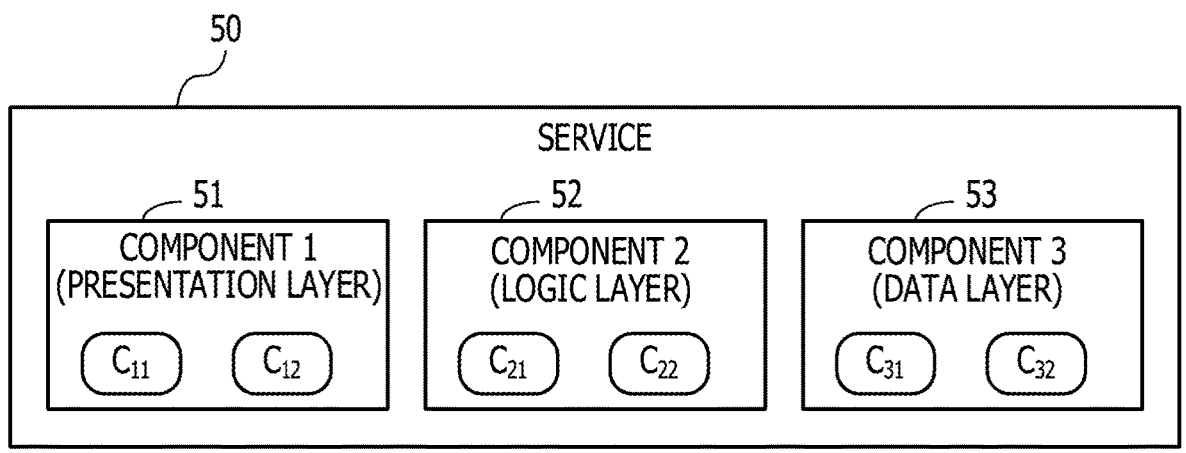
FIG. 4 is a diagram illustrating the concept of a microservices architecture.

FIG. 4 is a diagram illustrating the concept of the microservices architecture. A service 50 to be provided to a user is enabled using multiple components 51 to 53. For example, the component 51 is software for executing a process of the presentation layer, the component 52 is software for executing a process of the logic layer, and the component 53 is software for executing a process of the data layer.

Each of the components 51 to 53 is executed by one or more of the multiple servers 42 to 44. Processing functions built in the servers 42 to 44 by the execution of the components 51 to 53 are containers. In the second embodiment, each of the containers is expressed by "$C_{xy}$". An index "x" of the container is an identification number (component number) of a component including the container, and an index "y" of the container is an identification number (container number) of the container included in the component.

In the microservices architecture, software for providing the single service 50 is generated so that the software is divided into the multiple small components 51 to 53. The components 51 to 53 are sparsely coupled. The sparse coupling indicates that the components 51 to 53 are relatively loosely coupled to each other and highly independent of each other. Since the components 51 to 53 are sparsely coupled, there is an advantage in that a change in a component due to the addition of a new component or the expansion of another component is small.

Each of the components 51 to 53 of the service generated based on the microservices architecture is executed by one or more containers. Thus, each of the components 51 to 53 has a one-to-one or one-to-many relationship with one or more containers.

A performance requirement for the service 50 to be provided to the user may be expressed using latency, for example. Thus, an administrator of the system prepares the components 51 to 53 with processing power sufficient to enable latency requested for the service 50. The processing power of the components 51 to 53 may be adjusted by increasing or reducing the numbers of containers for executing the components 51 to 53.

It is easy for the administrator to define the performance requirement requested for the service 50. It is, however, difficult for the administrator to determine resources to be assigned to the components so that the latency requested for the service 50 is satisfied. In the second embodiment, the managing server 100 detects a component with insufficient performance, adds a container for executing the component, and assigns a resource to the component so that the performance requirement for the service 50 is satisfied.

Figure 5:
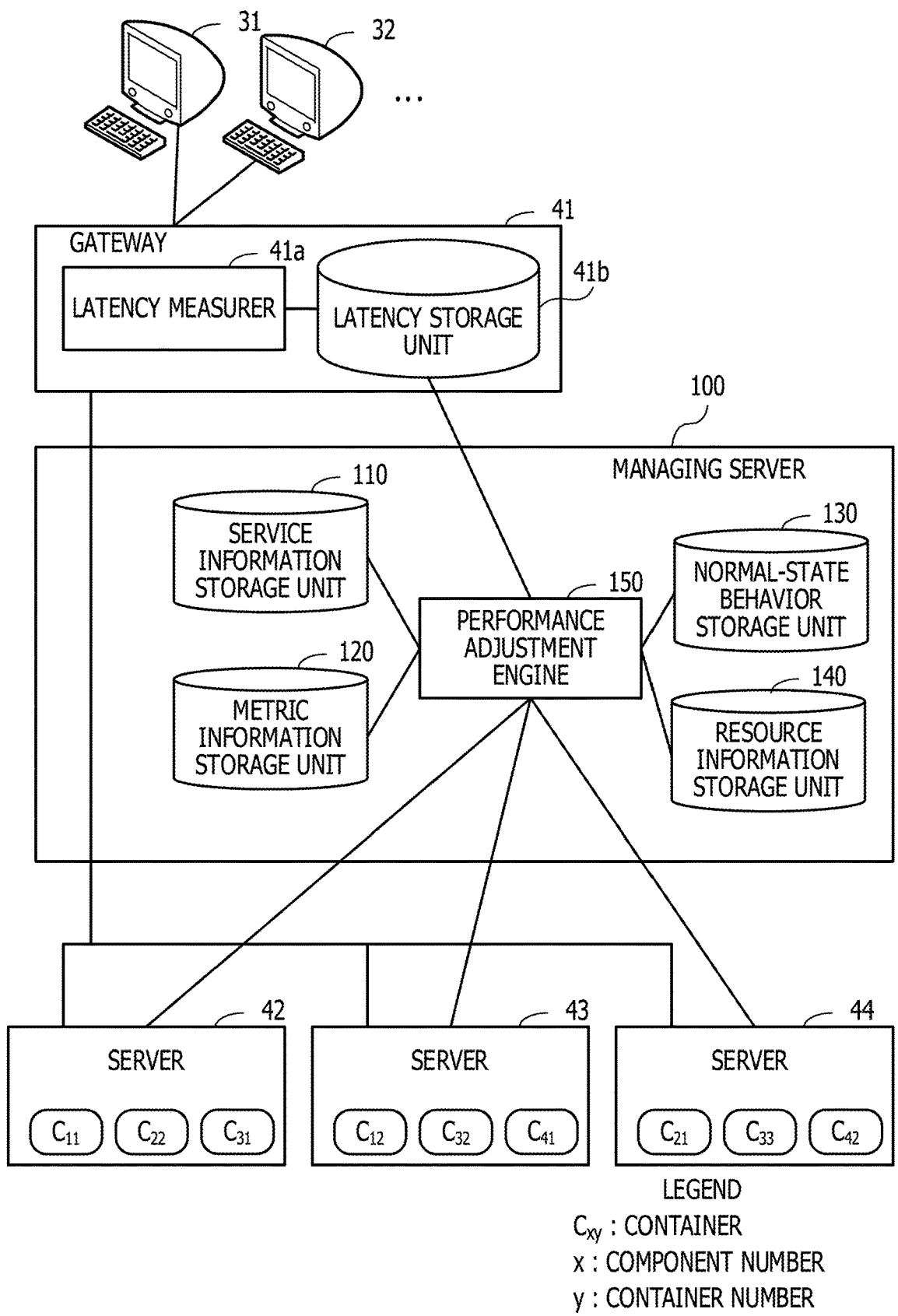
FIG. 5 is a block diagram illustrating functions included in a gateway and the managing server and used to adjust performance.

FIG. 5 is a block diagram illustrating functions included in the gateway and the managing server and used to adjust performance. The gateway 41 includes a latency measurer 41a and a latency storage unit 41b. The latency measurer 41a measures time periods from the reception of requests from the terminal devices 31, 32, . . . to the transmission of responses to the requests to the terminal devices 31, 32, . . . . The latency measurer 41a causes the measured time periods to be stored in the latency storage unit 41b as latency for services to be provided in accordance with the requests. The latency storage unit 41b stores the latency measured by the latency measurer 41a.

The managing server 100 includes a service information storage unit 110, a metric information storage unit 120, a normal-state behavior storage unit 130, a resource information storage unit 140, and a performance adjustment engine 150. The service information storage unit 110 stores information on services to be provided. The metric information storage unit 120 stores information (metrics) on operational states of resources consumed by the servers 42 to 44 and containers. The normal-state behavior storage unit 130 stores information indicating behaviors of multiple containers in a normal state and behaviors of the multiple servers in the normal state. The resource information storage unit 140 stores information on resources consumed by the servers 42 to 44. The performance adjustment engine 150 uses the information stored in the service information storage unit 110, the metric information storage unit 120, the normal-state behavior storage unit 130, and the resource information storage unit 140 to adjust the performance on a component basis.

In the following description, the implementation of a container for executing a process of a component in a server is referred to as container deployment. The container deployment is a process of installing a program for executing the component in the server and activating a process for executing the process of the component based on the program. The implementation of the container in the server indicates the deployment of the container in the server.

In the example illustrated in FIG. 5, in each of the servers 42 to 44, multiple containers for executing different components are deployed. For example, containers $C_{11}$, $C_{22}$, and $C_{31}$ are deployed in the server 42.

The information stored in the service information storage unit 110, the information stored in the metric information storage unit 120, the information stored in the normal-state behavior storage unit 130, and the information stored in the resource information storage unit 140 are described below in detail with reference to FIGS. 6 to 10.

Figure 6:
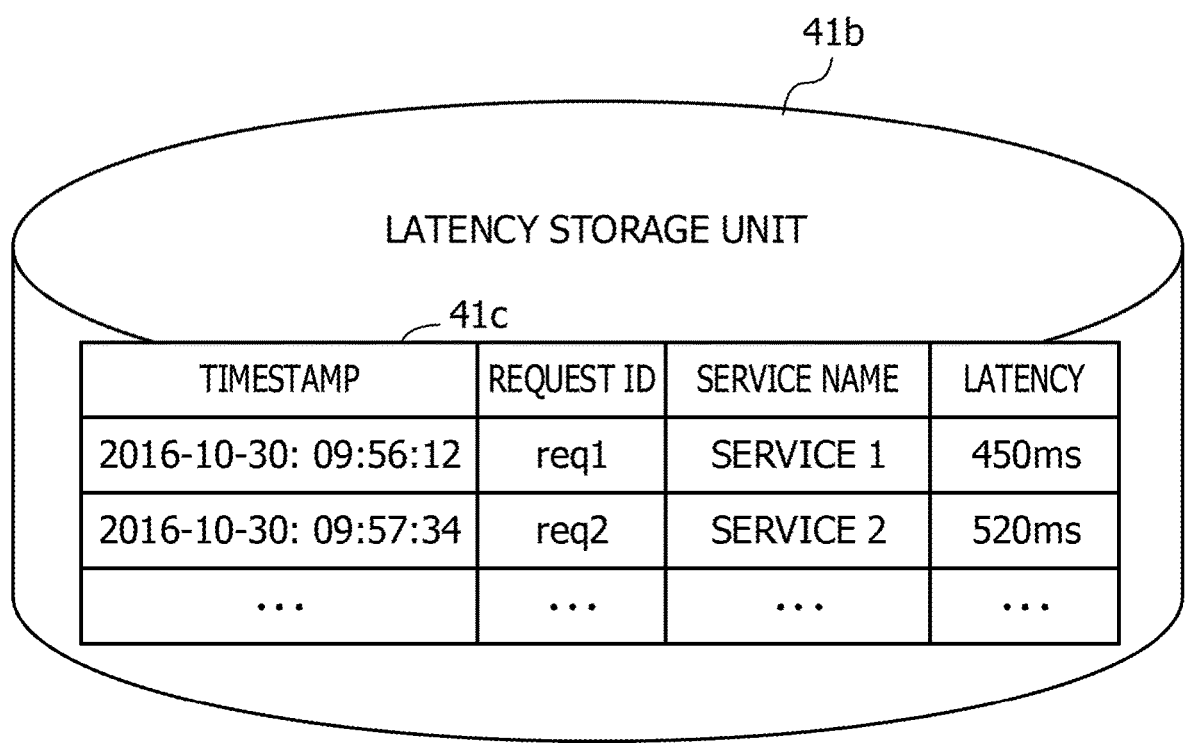
FIG. 6 is a diagram illustrating an example of information stored in a latency storage unit.

FIG. 6 is a diagram illustrating an example of the information stored in the latency storage unit. The latency storage unit 41b stores a latency management table 41c, for example. The latency management table 41c includes fields for time stamps, request IDs, service IDs, and latency.

In the field for timestamps, time and dates when the latency has been measured are set. In the field for request IDs, identification information (request IDs) of requests for which the latency has been measured is set. In the field for service names, the names (service names) of services corresponding to the requests for which the latency has been measured are set. In the field for latency, the measured latency is set.

Figure 7:
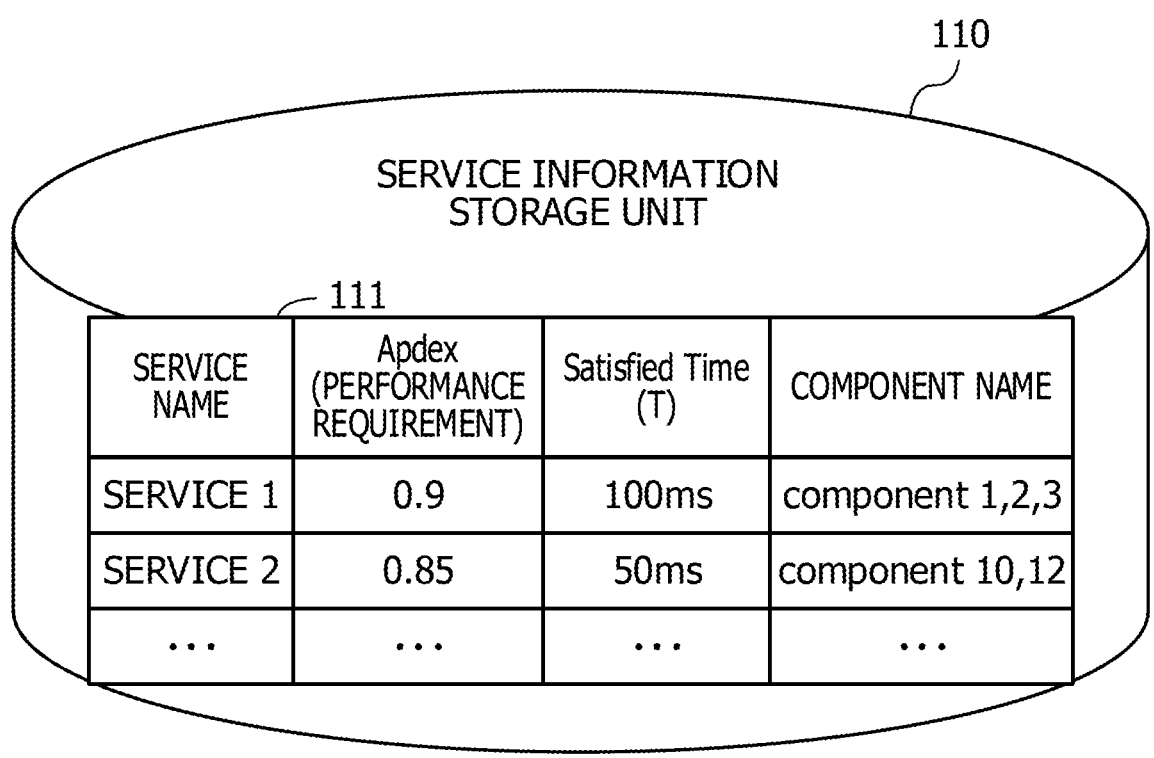
FIG. 7 is a diagram illustrating an example of information stored in a service information storage unit.

FIG. 7 is a diagram illustrating an example of the information stored in the service information storage unit. The service information storage unit 110 stores a service management table 111, for example. The service management table 111 includes fields for service names, application performance indices (Apdex), satisfied time, and component names. In the field for service names, the names (service names) of services being provided are set. In the field for Apdex, performance requirements for the services are set as Apdex. Apdex is indices indicating levels of satisfaction of the user with latency. In the field for satisfied time, the maximum latency values (T) with which the user who uses the services is considered to be satisfied. In the field for component names, the names of components used to provide the services are set.

Apdex is described below in detail. Apdex is an index standardized by "The Alliance" and is calculated according to the following equation. Apdex=((satisfied counts)+(tolerating counts)/2)/(total counts). "Satisfied counts" is the number of requests for which latency that is equal to or shorter than T is obtained. For example, "satisfied counts" is the number of requests for which latency satisfied by the user is obtained.

"Tolerating counts" is the number of requests for which latency that is longer than T and equal to or shorter than 4×T is obtained. "Tolerating counts" is the number of requests for which latency that is not satisfied by the user but is acceptable is obtained.

The number of requests for which latency that is longer than 4×T is obtained is referred to as "frustrated". "Frustrated" is the number of requests for which latency unsatisfied by the user is obtained.

In the second embodiment, when an Apdex value calculated based on latency of a service is equal to or larger than an Apdex value set as a performance requirement for the service, it is determined that the service satisfies the performance requirement. On the other hand, when the Apdex value calculated based on the latency of the service is smaller than the Apdex value set as the performance requirement, it is determined that the service does not satisfy the performance requirement.

Figure 8:
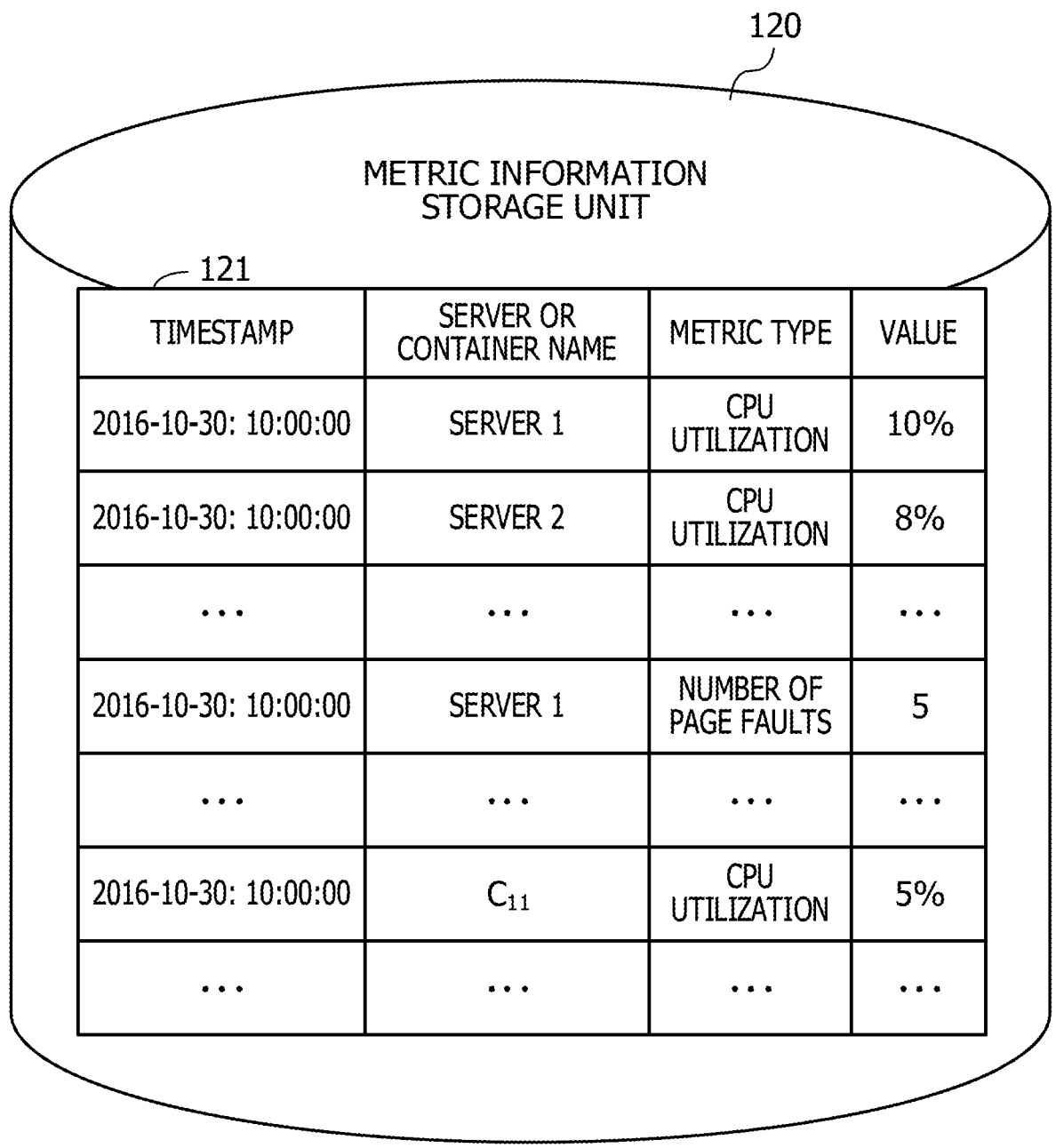
FIG. 8 is a diagram illustrating an example of information stored in a metric information storage unit.

FIG. 8 is a diagram illustrating an example of the information stored in the metric information storage unit. The metric information storage unit 120 stores a metric management table 121, for example. The metric management table 121 includes fields for time stamps, server or container names, metric types, and values. In the field for timestamps, time and dates when metric values have been measured are set. In the field for server or container names, the names of servers or containers that have measured the metric values are set. In the field for metric types, types (metric types) of the measured metric values are set. In the field for values, the measured metric values are set.

FIG. 9 is a diagram illustrating an example of the information stored in the normal-state behavior storage unit. The normal-state behavior storage unit 130 stores multiple container behavior management tables 131a, 131b, . . . for behavior measurement time intervals and multiple server behavior management tables 132a, 132b . . . for behavior measurement time intervals.

The multiple container behavior management tables 131a, 131b, . . . are associated with the measurement time intervals in which behaviors of containers are measured. The multiple container behavior management tables 131a, 131b, . . . include fields for containers, metric types, percentile types, percentile values, and weighted percentile values. In the fields for containers, the names (container names) of containers of which behaviors are to be measured are set. In the fields for metric types, types of metrics in which the behaviors have been measured are set. In the fields for percentile types, types of percentiles calculated for metric values are set. For example, 50th percentiles, 90th percentiles, 99th percentiles, and the like are set as the percentile types. In the fields for percentile values, percentile values indicated by the percentile types for the corresponding metric types are set. In the weighted percentile values, percentile values weighted for the metrics of the containers based on metric values for past several time intervals are set. The weighted percentile values are described later in detail (refer to FIG. 15).

The multiple server behavior management tables 132a, 132b, . . . are associated with the measurement time intervals in which behaviors of servers are measured. The multiple server behavior management tables 132a, 132b, . . . include fields for servers, metric types, percentile types, percentile values, and weighted percentile values. In the fields for servers, the names (server names) of servers of which behaviors are to be measured are set. In the fields for metric types, types of metrics in which the behaviors have been measured are set. In the fields for percentile types, types of percentiles calculated for metric values are set. For example, 50th percentiles, 90th percentiles, 99th percentiles, and the like are set as the types of the percentiles. In the fields for percentile values, percentile values indicated by the percentile types for the corresponding servers are set. In the fields for weighted percentile values, percentile values weighted for the metrics of the servers based on metric values for past several time intervals are set.

The percentiles are one type of representative statistical values. When multiple data items are placed in order from the largest data item to the smallest data item, the ratio of the number of data items smaller than a value x (x is a real number) to all the data items is equal to or lower than p % (p is a real number equal to or larger than 0 and equal to or smaller than 100), and the ratio of the number of data items larger than the value x to all the data items is (100−p) %, the value x is a p-th percentile.

Figure 10:
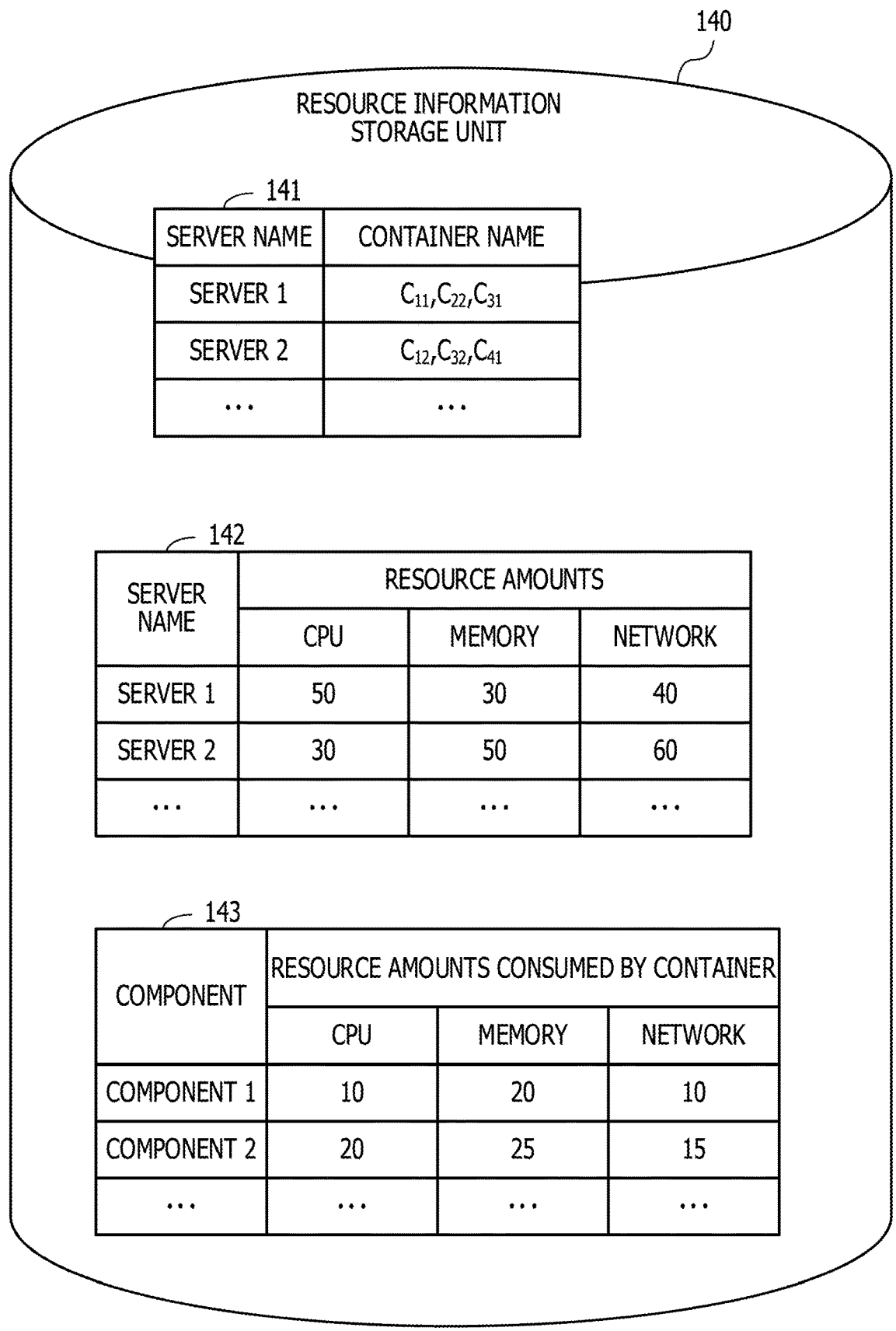
FIG. 10 is a diagram illustrating an example of information stored in a resource information storage unit.

FIG. 10 is a diagram illustrating an example of the information stored in the resource information storage unit. The resource information storage unit 140 stores a container deployment management table 141, a server resource management table 142, and a container resource management table 143, for example.

The container deployment management 141 is a data table to be used to manage deployment states of containers in the servers 42 to 44. The container deployment management 141 includes fields for server names and container names. In the field for server names, the names (server names) of servers in which containers are implemented are set. In the field for containers, the names (container names) of the containers implemented in the servers are set.

The server resource management table 142 is a data table to be used to manage the amounts of resources of the servers 42 to 44. The server resource management table 142 includes fields for server names and resource amounts. In the field for server names, the names (server names) of servers used to provide the service are set. In the field for resource amounts, resource amounts of the servers are set for types of the resources. In the example illustrated in FIG. 10, the amounts of resources, which are CPUs, memories, and the network, are set.

The container resource management table 143 is a data table to be used to manage resource amounts consumed by containers of components. The container resource management table 143 includes fields for components and resource amounts consumed by a container. In the field for components, the names (component names) of components used to provide the service are set. In the field for resource amounts consumed by a container, resource amounts consumed by containers of the components are set for the resource types. In the example illustrated in FIG. 10, the amounts of resources, which are the CPUs, the memories, and the network and are consumed by the containers, are set.

Next, the performance adjustment engine 150 is described in detail.

Figure 11:
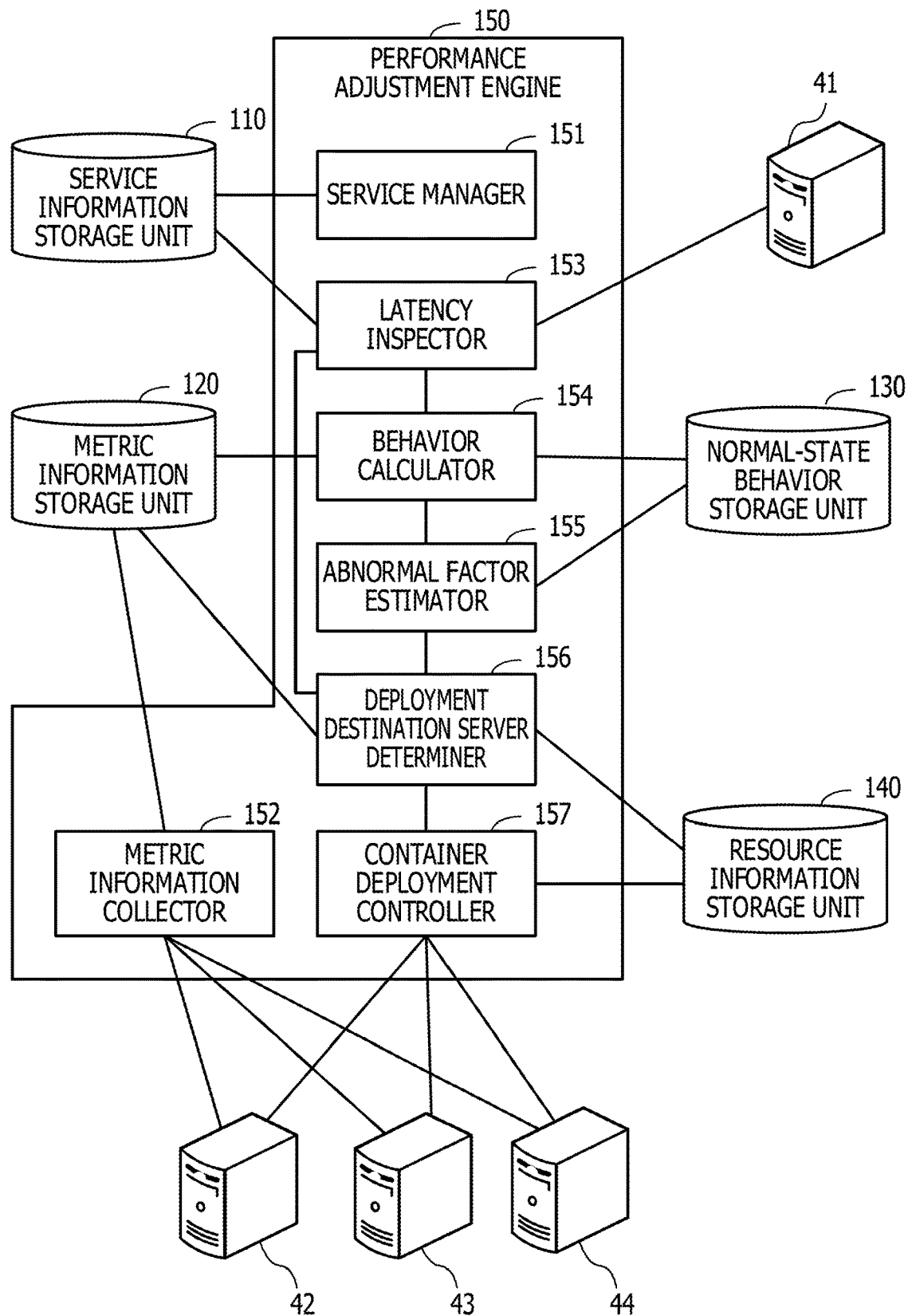
FIG. 11 is a block diagram illustrating functions of a performance adjustment engine.

FIG. 11 is a block diagram illustrating functions of the performance adjustment engine 150. The performance adjustment engine 150 includes a service manager 151, a metric information collector 152, a latency inspector 153, a behavior calculator 154, an abnormal factor estimator 155, and a container deployment controller 156.

The service manager 151 manages a configuration of the service and the performance requirement for the service. The metric information collector 152 periodically collects metric values from the servers 42 to 44 and causes the collected metric values to be stored in the metric information storage unit 120. The latency inspector 153 inspects whether or not latency of the service satisfies the performance requirement. The behavior calculator 154 calculates behaviors of containers and behaviors of the servers in the normal state and calculates behaviors of the containers and behaviors of the servers in an abnormal state. The behavior calculator 154 causes the behaviors in the normal state to be stored in the normal-state behavior storage unit 130. The abnormal factor estimator 155 estimates a component (factor component) causing an abnormality of the service of which latency does not satisfy the performance requirement. The container deployment controller 156 executes scale out on the factor component or changes the deployment of containers for executing the factor component.

Lines that are illustrated in FIG. 11 and connect the elements to each other indicate some of communication paths, and communication paths other than the communication paths illustrated in FIG. 11 may be set. Functions of the elements illustrated in FIG. 11 may be enabled by causing a computer to execute program modules corresponding to the elements.

Next, a process of determining whether or not services satisfy performance requirements is described. The process of determining whether or not the services satisfy the performance requirements is executed by the performance adjustment engine 150.

Figure 12:
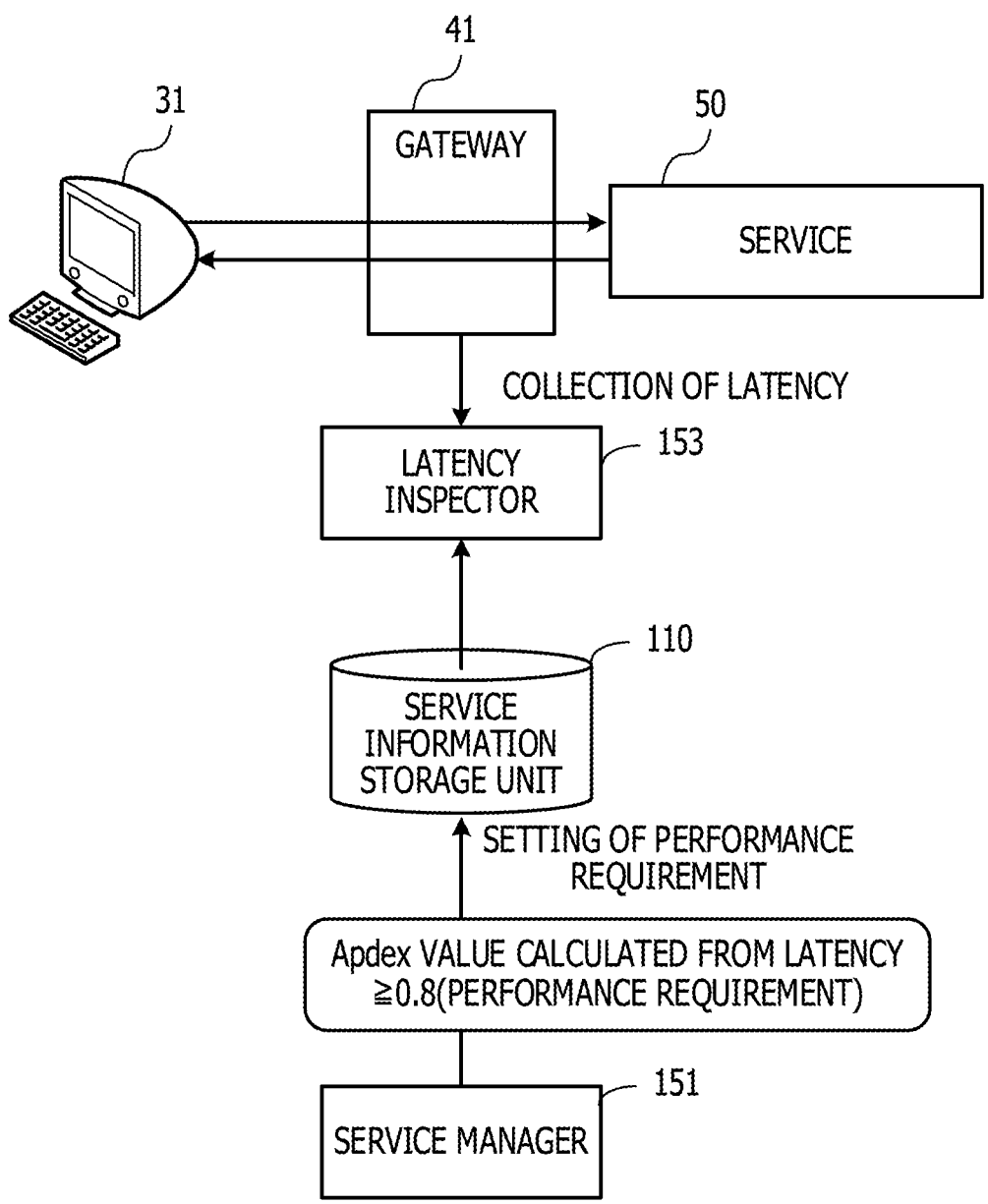
FIG. 12 is a diagram illustrating an example of a process of determining whether or not a performance requirement is satisfied.

FIG. 12 is a diagram illustrating an example of the process of determining whether or not the performance requirement is satisfied. The service manager 151 registers an Apdex value as the performance requirement for the service 50 in the service information storage unit 110 in accordance with an entry by the administrator. For example, the service manager 151 receives the Apdex value entered by the administrator and satisfied time (T) entered by the administrator. Then, the service manager 151 causes the entered Apdex value and the entered satisfied time (T) to be stored in the service management table 111 so that the Apdex value and the satisfied time (T) are associated with the service name of the service 50 in the service management table 111.

The latency inspector 153 periodically collects, from the gateway 41, latency related to a request for the service 50 in the latest predetermined time period. The latency of the service is the difference between the time when the gateway 41 receives the request issued by a terminal device 31 and the time when the gateway 41 transmits a response to the terminal device 31. The latency inspector 153 calculates an Apdex value within the predetermined time period based on the acquired latency. When the calculated Apdex value is equal to or larger than the Apdex value specified as the performance requirement, the latency inspector 153 determines that the service satisfies the performance requirement. When the calculated Apdex value is smaller than the Apdex value specified as the performance requirement, the latency inspector 153 determines that the service does not satisfy the performance requirement.

Then, metric information of the containers and the servers is collected by the metric information collector 152 and stored in the metric information storage unit 120. The collected metric information includes, for example, CPU utilization, input and output (I/O) rates of the memories, the numbers of page faults, I/O rates of disks (file systems), network reception rates, and network transmission rates. The behavior calculator 154 calculates, based on the collected metric information, behaviors of the containers and behaviors of the servers within the latest predetermined time period.

Figure 13:
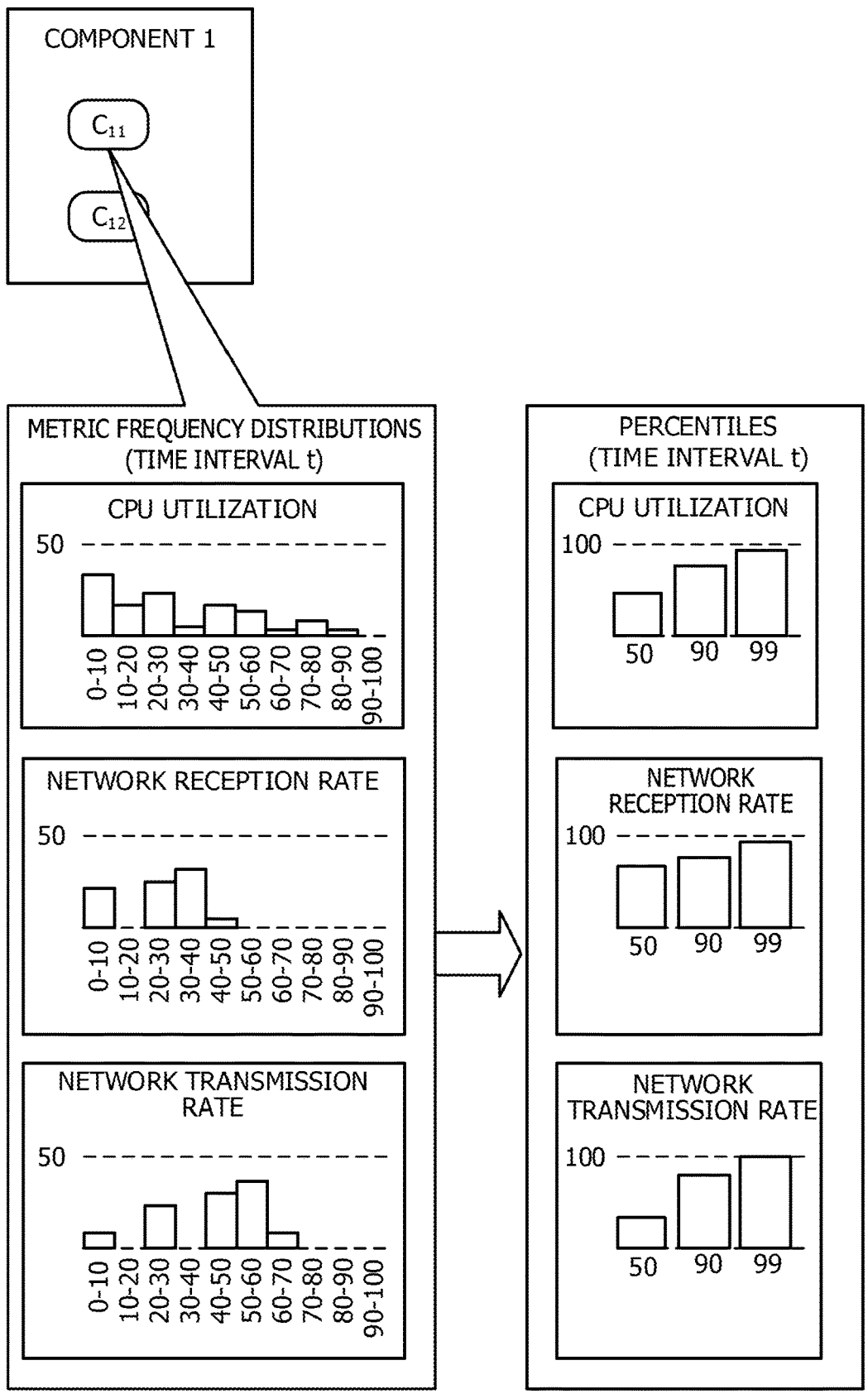
FIG. 13 is a diagram illustrating an example of the calculation of behaviors of containers.

FIG. 13 is a diagram illustrating an example of the calculation of the behaviors of the containers. The example illustrated in FIG. 13 assumes that a behavior of a container $C_{11}$ is calculated. The behavior calculator 154 extracts, from the metric information storage unit 120, records in which container names are "$C_{11}$". Then, the behavior calculator 154 classifies the extracted records based on the metric types. Then, the behavior calculator 154 normalizes values (metric values) set in records in which the same metric type is set so that the values are in a range of 0 to 100, and the behavior calculator 154 generates frequency distributions. For example, the behavior calculator 154 normalizes the values so that the theoretically maximum value among the metric values is "100". Then, the behavior calculator 154 calculates a 50th percentile value, a 90th percentile value, and a 99th percentile value for each of the metric types based on the frequency distributions.

The behavior calculator 154 calculates behaviors of all containers for executing components for enabling the service 50. When the latency inspector 153 determines that the service 50 satisfies the performance requirement, the behavior calculator 154 generates a container behavior management table 131a for a latest time interval and causes the generated container behavior management table 131a to be stored in the normal-state behavior storage unit 130.

Figure 14:
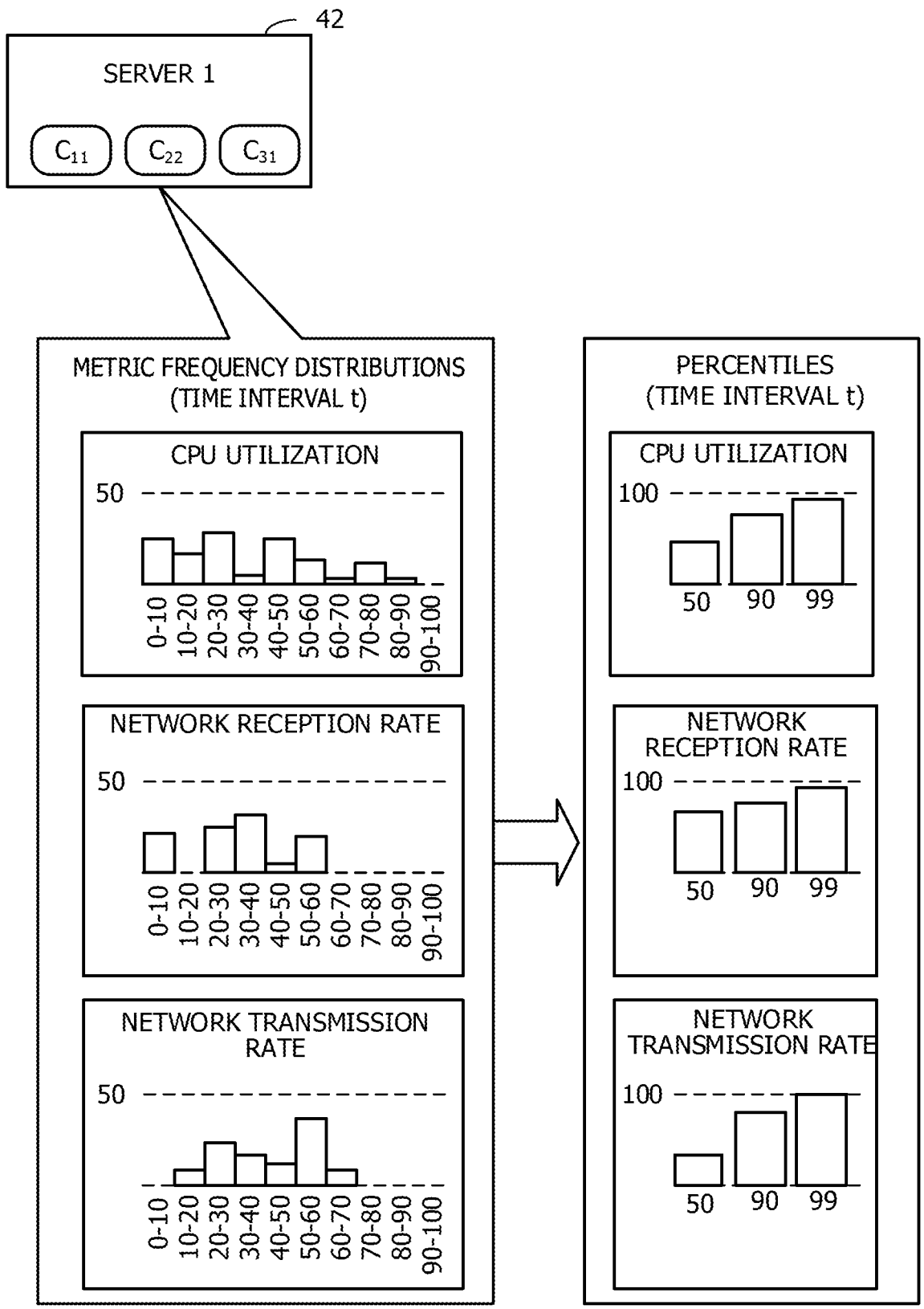
FIG. 14 is a diagram illustrating an example of the calculation of behaviors of servers.

FIG. 14 is a diagram illustrating an example of the calculation of the behaviors of the servers. The example illustrated in FIG. 14 assumes that a behavior of the server 42 having a server name "server 1" is calculated. The behavior calculator 154 extracts, from the metric information storage unit 120, records in which server names are "server 1". Then, the behavior calculator 154 classifies the extracted records based on the metric types. The behavior calculator 154 normalizes values (metric values) set in records in which the same metric type is set so that the values are in a range of 0 to 100, and the behavior calculator 154 generates frequency distributions. Then, the behavior calculator 154 calculates a 50th percentile value, a 90th percentile value, and a 99th percentile value for each of the metric types based on the frequency distributions.

The behavior calculator 154 calculates behaviors of all the servers 42 to 44. When the latency inspector 153 determines that the service 50 satisfies the performance requirement, the behavior calculator 154 generates a server behavior management table 132a for the latest time interval and causes the generated server behavior management table 132a to be stored in the normal-state behavior storage unit 130.

When the latency inspector 153 determines that the service 50 does not satisfy the performance requirement, the behavior calculator 154 transmits, as information indicating behaviors in the abnormal state, the calculated percentile values for the containers and the servers to the abnormal factor estimator 155. Then, the abnormal factor estimator 155 compares the behaviors in the normal state with the behaviors in the abnormal state and estimates a component causing an increase in the latency of the service.

For example, the abnormal factor estimator 155 acquires, from the normal-state behavior storage unit 130, percentile values for metrics of containers for a number n (n is an integer of 1 or more) of latest time intervals. Then, the abnormal factor estimator 155 determines behaviors of the metrics in the normal state based on the acquired percentile values. In this case, the abnormal factor estimator 155 weights the percentile values based on the time intervals in which the percentile values have been acquired, and the abnormal factor estimator 155 treats the behaviors so that as a behavior is acquired in a more recent time interval, the behavior is treated to be closer to a behavior in the future.

Figure 15:
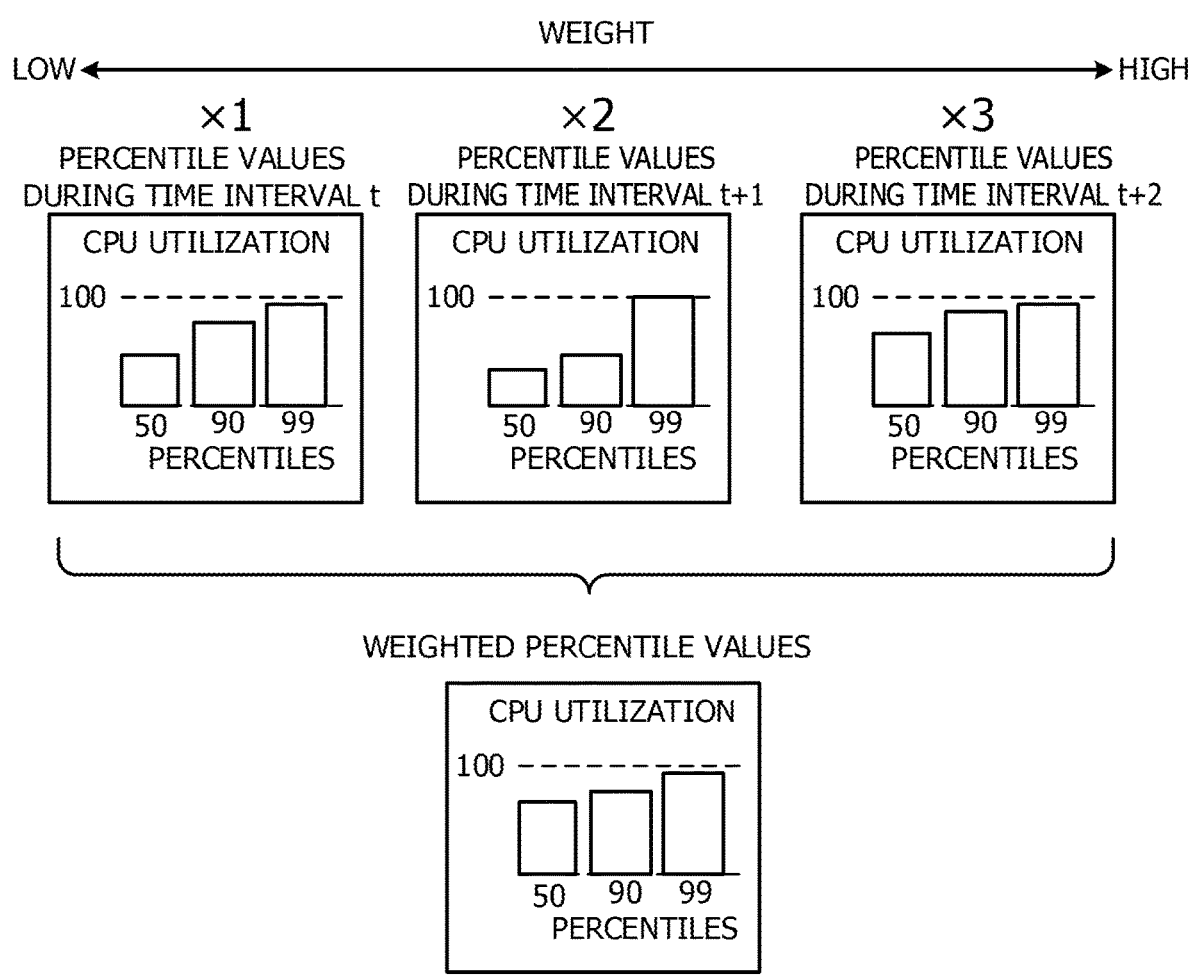
FIG. 15 is a diagram illustrating an example of weighted percentile values.

FIG. 15 is a diagram illustrating an example of the weighted percentile values. The example illustrated in FIG. 15 assumes that percentile values in the normal state in three time intervals t, t+1, and t+2 are acquired. In this case, the abnormal factor estimator 155 sets, to "3", a weight of a percentile value in the latest time interval t+2. The abnormal factor estimator 155 sets, to "2", a weight of a percentile value in the time interval t+1 immediately previous to the time interval t+2. The abnormal factor estimator 155 sets, to "1", a weight of a percentile value in the time interval t immediately previous to the time interval t+1.

In this manner, the abnormal factor estimator 155 calculates percentile values (weighted percentile values) for the metrics within the number n of time intervals so that as a percentile value is acquired in a more recent time interval, a weight for the percentile value is larger. For example, the weighted percentile values are calculated as follows.

It is assumed that the following data items are obtained as percentile values in the normal state. S1 is a set of data items within a latest time interval. S2 is a set of data items within a time interval immediately previous to the latest time interval in which S1 is obtained. S3 is a set of data items within a time interval immediately previous to the time interval in which S2 is obtained. S1={1, 2}, S2={3, 4}, and S3={5, 6}.

In this example, values of the data items are simplified in order to clarify a weighting process. To calculate weighted percentile values for S1, S2, and S3, the numbers of normal data items are increased for weights. For example, weights for the sets S1, S2, S3 are "3", "2", and "1". In this case, the sets S1, S2, and S3 are replaced with the following sets. S1'=S1×3:{1, 1, 1, 2, 2, 2}, S2'=S2×2:{3, 3, 4, 4}, and S3'=S3×1:{5, 6}.

The set S1' is obtained by multiplying the set S1 by 3. The set S1' is obtained by collecting three sets S1. The set S2' is obtained by multiplying the set S2 by 2. The set S2' is obtained by collecting two sets S2. The set S3' is the same as the set S3. The abnormal factor estimator 155 organizes the sets S1', S2', and S'3 into a single set and sorts the data items in ascending order. For example, the abnormal factor estimator 155 generates, for the number of weights, the same sets as the sets for the time intervals, organizes the generated sets into a single set, and sorts the data items in ascending order. As a result of the sorting, the following set S is obtained. S={1, 1, 1, 2, 2, 2, 3, 3, 4, 4, 5, 6}.

The abnormal factor estimator 155 treats percentile values obtained based on the set S as weighted percentile values. Thus, a 50th percentile value is "2", and a 90th percentile value is "4".

The abnormal factor estimator 155 compares a weighted percentile value in the normal state with a latest percentile value indicating a behavior in an abnormal state for each of the metric types and calculates factor degrees related to the metric types. For example, the abnormal factor estimator 155 calculates a positive factor degree and a negative factor degree as the factor degrees.

FIG. 16 is a diagram illustrating an example of the calculation of the factor degrees. In the example illustrated in FIG. 16, as weighted percentile values indicating behaviors in the normal state, a 50th percentile value is "15", a 90th percentile value is "71", and a 99th percentile value is "90". As weighted percentile values indicating behaviors in an abnormal state, a 50th percentile value is "6", a 90th percentile value is "92", and a 99th percentile value is "98".

A positive factor degree and a negative factor degree are defined as follows. The positive factor degree $F_+ = \Sigma$ (an increase in p of a p-th percentile whose value increases)×(the difference between percentile values). The negative factor degree $F_- = \Sigma$ (an increase in p of a p-th percentile whose value decreases)×(the difference between percentile values).

P is a numerical value indicating a percentile type. When a p-th percentile is a 50th percentile, p=50. The p-th percentile whose value increases is a percentile type indicating that a percentile value of the percentile type in an abnormal state is larger than a percentile value of the percentile type in the normal state. The p-th percentile whose value decreases is a percentile type indicating that a percentile value of the percentile type in the normal state is larger than a percentile value of the percentile type in an abnormal state.

When the percentile types are arranged in ascending order of p value, the increase in p of the p-th percentile indicates an increase in a p value of a target percentile type from a p value of a percentile type that is next smaller than the p value of the target percentile type. In the example illustrated in FIG. 16, there are the 50th percentile, the 90th percentile, and the 99th percentile. In this case, an increase in p of the 50th percentile is "50", an increase in p of the 90th percentile is "40" (90−50), and an increase in p of the 99th percentile is "9" (99−90).

When the latency of the service does not satisfy the performance requirement, and loads of the containers and the servers are higher than those in the normal state, most of metric values are high and positive factor degrees are high. When the latency of the service does not satisfy the performance requirement, and the loads of the containers and the servers are lower than those in the normal state, most of the metric values are low and negative factor degrees are high. When the latency of the service satisfies the performance requirement, and a negative factor degree of a container or server is higher than a positive factor degree of the container or server, it may be determined that the performance decreases due to another factor other than the container or server.

In the example illustrated in FIG. 16, the factor degrees are as follows. The positive factor degree $F_{-+}=(90-50)\times(92-71)+(99-90)\times(98-90)=912$. The negative factor degree $F_{-\_}=50\times(15-6)=450$.

The abnormal factor estimator 155 calculates factor degrees for each of the metric types. Then, the abnormal factor estimator 155 estimates, as a factor component causing an abnormality, a component executed by a container from which the maximum factor degree has been calculated.

FIG. 17 is a diagram illustrating an example of the estimation of the factor component. As illustrated in FIG. 17, a positive factor degree and a negative factor degree are calculated for each of the metric types for each of all containers. The abnormal factor estimator 155 extracts the maximum factor degree from the calculated factor degrees. In the example illustrated in FIG. 17, a positive factor degree for CPU utilization of the container $C_{11}$ is the maximum value. The abnormal factor estimator 155 estimates, as the factor component, a component (component name "component 1") executed by the container $C_{11}$ from which the extracted factor degree has been calculated. In this case, the abnormal factor estimator 155 treats the metric type "CPU utilization" corresponding to the maximum factor degree as a factor metric. In addition, the abnormal factor estimator 155 sets, to positive, a container factor degree code indicating whether the maximum factor degree is a positive factor degree or a negative factor degree.

In addition, the abnormal factor estimator 155 acquires, from the container deployment management table 141, the name of a server in which the container from which the maximum factor degree has been calculated is already implemented. Then, the abnormal factor estimator 155 treats the acquired server name as the name of a container executing server. In the example illustrated in FIG. 17, the container executing server is "server 1".

When the container factor degree code is positive, it may be estimated that a maximum factor degree component is a factor causing an increase in the latency of the service. For example, when a process load of a container executing a process of a component becomes excessive, percentile values increase to values higher than those in the normal state. As a result, the container factor degree code becomes positive.

On the other hand, when the container factor degree code is negative, it is considered that a component other than the maximum factor degree component causes the increase in the latency of the service. When the container factor degree code is negative, the abnormal factor estimator 155 estimates, as the factor component, a component of which a metric value of a network transmission rate decreases to a value smaller than that in the normal state, regardless of the fact that a metric value of a network reception rate increases to a value larger than that in the normal state.

To estimate the factor component when the container factor degree code is negative, the abnormal factor estimator 155 calculates a factor degree of the component in the same manner as the calculation of a factor degree of a container. For example, the abnormal factor estimator 155 calculates a positive factor degree and a negative factor degree as the factor degree of the component.

The abnormal factor estimator 155 calculates a weighted percentile value for each metric type based on metric values of containers for executing a process of the component in the same manner as the calculation described with reference to FIG. 16. For example, the abnormal factor estimator 155 calculates the factor degree of the component based on the metric values of the containers for executing the process of the component, while the abnormal factor estimator 155 calculates factor degrees of the containers based on the metric values of the containers.

Figure 18:
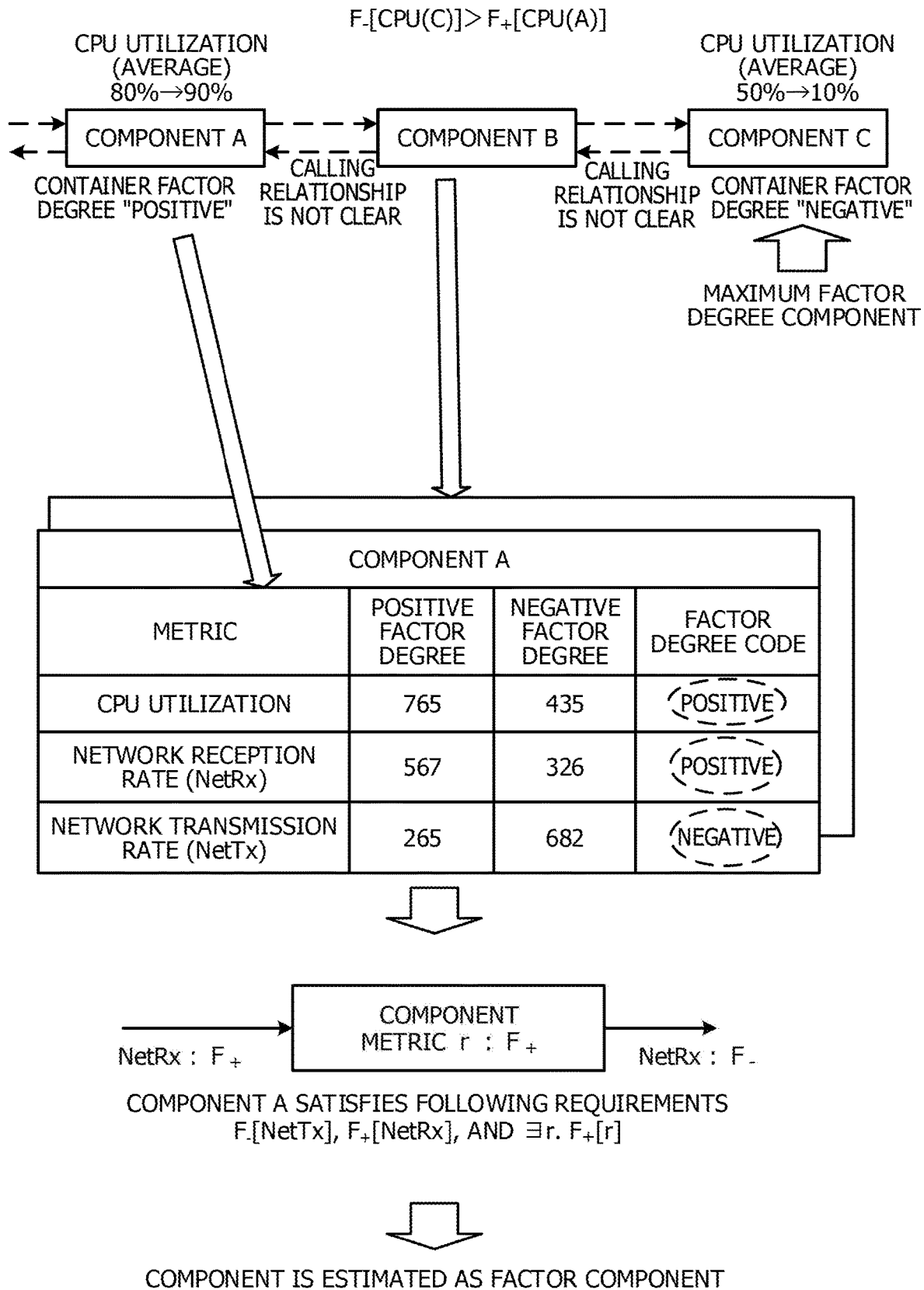
FIG. 18 is a diagram illustrating an example of the estimation of a factor component in the case where a container factor degree code is negative.

FIG. 18 is a diagram illustrating an example of the estimation of the factor component when the container factor degree code is negative. In the example illustrated in FIG. 18, a service is provided by causing a "component A", a "component B", and a "component C" to coordinate with each other. A container of the "component A" calls a container of the "component B", and the container of the "component B" calls a container of the "component C". The managing server 100 does not recognize calling relationships between the components.

It is assumed that the number of requests for the service rapidly increases and average CPU utilization of the container of the "component A" is normally "80%" but increases to "90%". When the CPU utilization becomes excessively high, a processing efficiency may decrease and the number of requests able to be processed per unit time period may decrease. In this case, the number of requests from the container of the "component A" to the container of the "component B" decreases. As a result, CPU utilization of the containers of the "component B" and "component C" decreases.

For example, it is assumed that average CPU utilization of the container of the "component C" is normally "50%" and decreases to "10%". It is assumed that the container of the "component B" normally executes a process with a low load and sufficient performance, and a change in a factor degree of the container of the "component B" is small even when the number of requests decreases. In this case, since the rate of decreasing the CPU utilization of the container of the "component C" is larger than the rate of increasing the CPU utilization of the container of the "component A", a change in the factor degree of the "component C" is larger than a change in the factor degree of the "component A". As a result, the "component C" is the maximum factor degree component. In this example, the factor causing the increase in the latency is the insufficiency (insufficiency of containers) of the amount of a resource of the "component A", and the "component C" is the maximum factor degree component but is not the factor causing the increase in the latency.

When the container factor degree code is negative, the abnormal factor estimator 155 searches a factor component from components other than the maximum factor degree component. For example, the number of requests for a component increases, and the abnormal factor estimator 155 searches the component unable to process the requests due to the increase in the number of requests.

For example, the abnormal factor estimator 155 calculates a positive factor degree and a negative factor degree for each of the metric types for each of the components. The abnormal factor estimator 155 sets, to "positive", a factor degree code for a metric of which a positive factor degree is larger than a negative factor degree. In addition, the abnormal factor estimator 155 sets, to "negative", a factor degree code for a metric of which a negative factor degree is larger than a positive factor degree. Then, the abnormal factor estimator 155 searches, from the components other than the maximum factor degree component, a component of which a factor degree code of a network reception rate is "positive", a factor degree code of a network transmission rate is "negative", and a factor degree code of a metric other than the network is "positive".

Thus, a component satisfying the following requirements for determining a factor component is searched. The requirements are $F_-[NetTx]$, $F_+[NetRx]$, and $\exists r.F_+[r]$.

$F_-[NetTx]$ indicates that a factor degree code of a network transmission rate of a component is "negative". $F_+[NetRx]$ indicates that a factor degree code of a network reception rate of a component is "positive". $\exists r.F_+[r]$ indicates that one or more metrics of which factor degree codes are "positive" exist among metrics of a component other than a network reception rate and network transmission rate of the component.

The abnormal factor estimator 155 estimates, as the factor component, a component satisfying the aforementioned requirements for determining a factor component. In the example illustrated in FIG. 18, the "component A" satisfies the requirements for determining a factor component and is estimated as the factor component.

When a component satisfying the requirements for determining a factor component is not found, the abnormal factor estimator 155 calculates factor degrees of the metric types of the servers. Then, the abnormal factor estimator 155 compares a positive factor degree with a negative factor degree for each of the metric types of the servers. When a positive factor degree of a certain metric type is equal to or larger than a negative factor degree of the certain metric type, the abnormal factor estimator 155 sets a factor degree code of the certain metric type to "positive". When the positive factor degree of the certain metric type is smaller than the negative factor degree of the certain metric type, the abnormal factor estimator 155 sets the factor degree code of the certain metric type to "negative".

Then, the abnormal factor estimator 155 determines a factor degree code of a factor metric of the container executing server as a server factor degree code.

FIG. 19 is a diagram illustrating an example of the determination of the server factor degree code. In the example illustrated in FIG. 19, since a factor degree code of a factor metric "CPU utilization" of the container executing server "server 1" is "positive", the server factor degree code is "positive".

Although factor degrees of the servers may be calculated in the same procedure as the calculation of factor degrees of containers, it is sufficient if factor degree codes of the metric types are clarified for the servers. For example, the factor degrees of the metric types may be calculated according to the following equation without distinguishing positive factor degrees with negative factor degrees. A factor degree $F_-=\Sigma$ (an increase in p of a p percentile)×(the difference between percentile values).

The difference between percentile values is a value obtained by subtracting a percentile value in an abnormal state from a percentile value in the normal state. When a factor degree F. calculated according to the aforementioned equation is equal to or larger than 0, a factor degree code is "positive". When the factor degree F. is a negative value, the factor degree code is "negative".

After the abnormal factor estimator 155 determines the factor component, the factor metric, the maximum factor degree code, and the server factor degree code, the container deployment controller 156 executes a performance improvement process of adding a container or changing a deployment destination of a container to improve the latency.

For example, when the container factor degree code is "positive", the container deployment controller 156 determines that the amount of a resource assigned to the factor component is insufficient, and the container deployment controller 156 executes scale out on the factor component. When the factor degree of the factor component is negative, and the server factor degree code is "positive", the container deployment controller 156 determines that the performance of the factor component decreases due to a high load of a resource assigned to a component other than the factor component. In this case, the container deployment controller 156 changes the deployment of containers. The change in the deployment of the containers is a process of changing a server executing the containers to another server so that the other server executes the containers.

A resource amount to be consumed by a container of a component may be defined. In this case, the container deployment controller 156 treats a server able to store the container as a candidate deployment destination upon the scale out of the component or a change in the deployment of the container. When multiple servers are treated as candidate deployment destinations, and a container is deployed in each of the candidate deployment destinations, the container deployment controller 156 determines, as a deployment destination, a candidate deploy destination that causes the minimum remaining resource amount of a server to be the largest.

Figure 20:
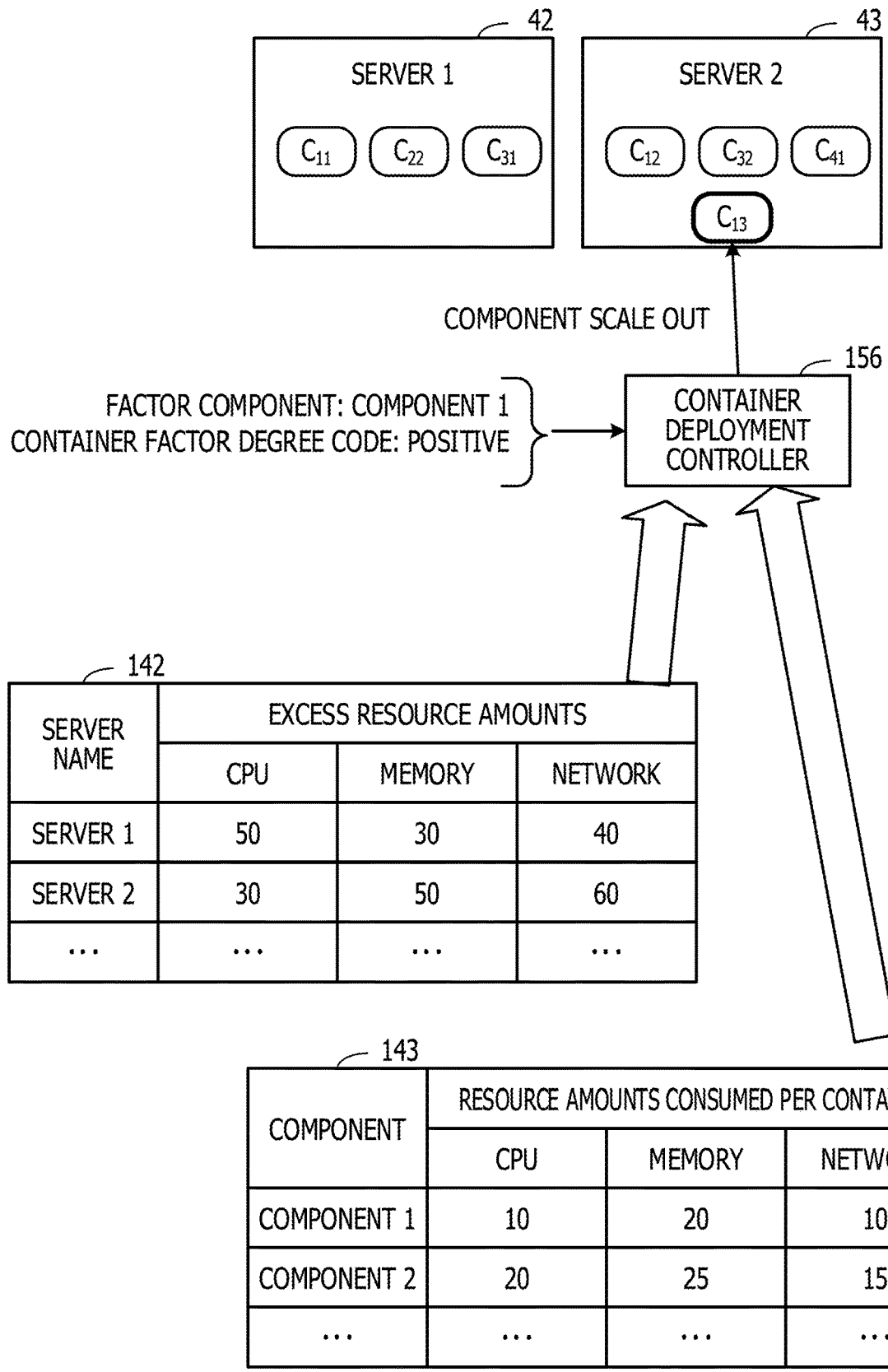
FIG. 20 is a diagram illustrating an example of the deployment of containers.

FIG. 20 is a diagram illustrating an example of the deployment of containers. In the example illustrated in FIG. 20, the factor component is a "component 1" and the container factor degree code is "positive". In this case, the container deployment controller 156 executes the scale out on the "component 1".

In this case, the container deployment controller 156 references the server source management table 142 and confirms excess resource amounts of the servers. In the example illustrated in FIG. 20, excess resource amounts of the "server 1" are CPU "50", memory "30", and network "40", and excess resource amounts of the "server 2" are CPU "30", memory "50", and network "60".

In addition, the container deployment controller 156 references the container resource management table 143 and confirms a resource amount consumed per container of the factor component. In the example illustrated in FIG. 20, resource amounts consumed per container of the "component 1" that is the factor component are CPU "10", memory "20", and network "10".

It is assumed that servers having excess resource amounts sufficient to deploy the container of the "component 1" are only a server 42 with the server name "server 1" and a server 43 with the server name "server 2". In this case, the server 42 and the server 43 are candidate deployment destinations.

Excess resource amounts of the server 42 with the server name "server 1" when the container of the "component 1" is deployed in the server 42 with the server name "server 1" are CPU "40", memory "10", and network "30". Excess resource amounts of the server 43 with the server name "server 2" when the container of the "component 1" is deployed in the server 43 with the server name "server 2" are CPU "20", memory "30", and network "50". In this case, the minimum excess resource amount of the server 42 with the server name "server 1" is memory "10", while the minimum excess resource amount of the server 43 with the server name "server 2" is CPU "20".

The container deployment controller 156 selects the server 43 with the server name "server 2" as a deployment destination, while the minimum recess resource amount of the server 43 is the largest. Then, the container deployment controller 156 deploys, in the server 43, a container $C_{13}$ for executing the "component 1" in the scale out process.

The container deployment controller 156 continuously executes the performance adjustment until the Apdex index reaches a target value. The container deployment controller 156 terminates the performance adjustment when the Apdex index reaches the target value.

FIG. 21 is a diagram illustrating an example of results of the performance adjustment. In the example illustrated in FIG. 21, the target value of Apdex is equal to or larger than 0.8. The Apdex value is "0.75" before the performance adjustment and is increased to "0.83" by the performance adjustment.

Next, a procedure for the performance adjustment process is described.

Figure 22A:
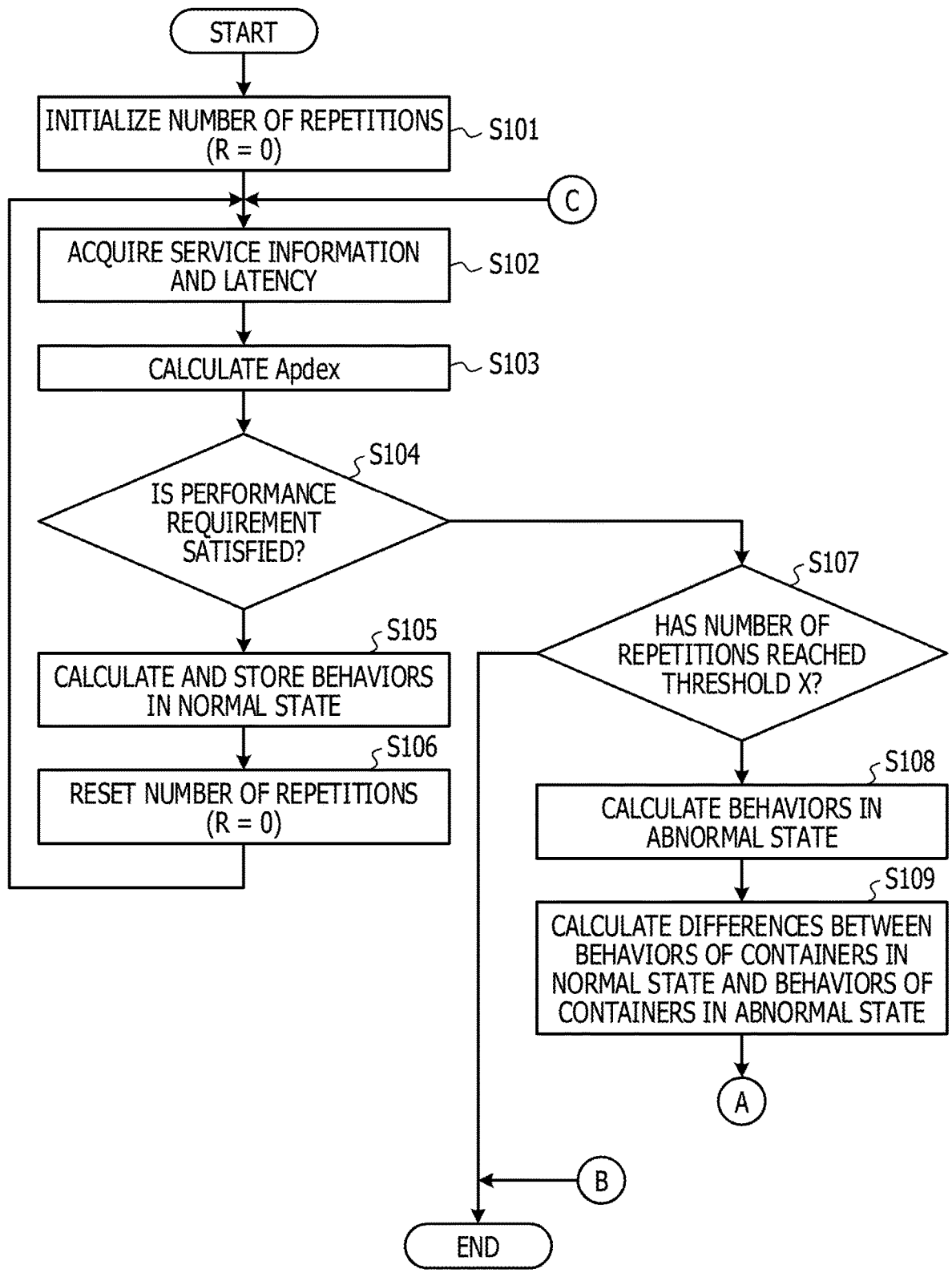
FIGS. 22A and 22B are a flowchart of an example of a procedure for a performance adjustment process.
Figure 22B:
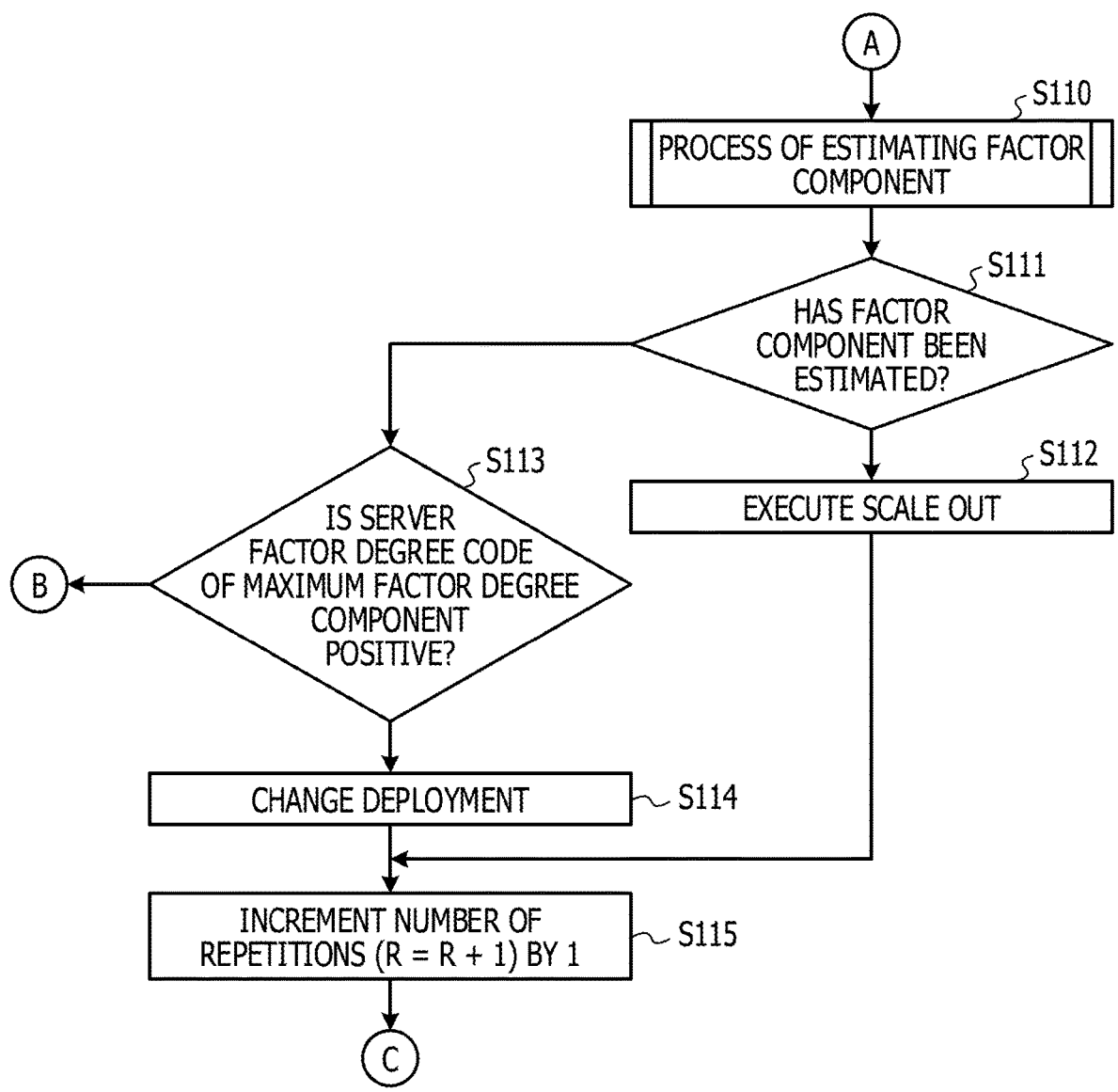

FIG. 22 (i.e. FIGS. 22A and 22B) is a flowchart of an example of the procedure for the performance adjustment process. The process illustrated in FIG. 22 is executed to adjust performance of a single service. In the case where performance of multiple services is adjusted, the process illustrated in FIG. 22 is executed on each of the multiple services. The process illustrated in FIG. 22 is described below using steps.

In step S101, the performance adjustment engine 150 initializes the value of a variable R indicating the number of repetitions to "0" when the administrator or the like enters an instruction to start the process of adjusting the performance of the service.

In step S102, the latency inspector 153 acquires service information on the service and latency of the service of which the performance is to be adjusted. For example, the latency inspector 153 acquires the service information from the service information storage unit 110. The acquired service information includes an Apdex value specified as a performance requirement and satisfied time (T) to be used to calculate Apdex. In addition, the latency inspector 153 acquires latency, measured within the latest predetermined time period, for requests for the service of which the performance is to be adjusted from the latency storage unit 41b of the gateway 41.

In step S103, the latency inspector 153 calculates an Apdex value of the service based on the latency for the multiple requests.

In step S104, the latency inspector 153 determines whether or not the Apdex value calculated in step S103 satisfies the performance requirement. For example, when the calculated Apdex value is equal to or larger than the Apdex value specified as the performance requirement, the latency inspector 153 determines that the Apdex value calculated in step S103 satisfies the performance requirement. When the Apdex value calculated in step S103 satisfies the performance requirement, the latency inspector 153 causes the process to proceed to step S105. When the Apdex value calculated in step S103 does not satisfy the performance requirement, the latency inspector 153 causes the process to proceed to step S107.

In step S105, the behavior calculator 154 calculates behaviors of containers and behaviors of the servers in the normal state and causes the calculated behaviors to be stored in the normal-state behavior storage unit 130. For example, the behavior calculator 154 acquires, from the metric information storage unit 120, metric values of the containers and the servers for the latest predetermined time period and calculates percentile values of multiple percentile types. Then, the behavior calculator 154 causes a container behavior management table including the set percentile values of the containers to be stored as information indicating the behaviors of the containers in the normal state in the normal-state behavior storage unit 130. In addition, the behavior calculator 154 causes a server behavior management table including the set percentile values of the servers to be stored as information indicating the behaviors of the servers in the normal state in the normal-state behavior storage unit 130.

In step S106, the performance adjustment engine 150 resets the variable R indicating the number of repetitions to "0". After that, the performance adjustment engine 150 causes the process to proceed to S102.

In step S107, the performance adjustment engine 150 determines whether or not the value of the variable R indicating the number of repetitions has reached a threshold X (X is an integer of 1 or more). When the number of repetitions has reached the threshold X, the performance adjustment engine 150 does not execute the performance adjustment and terminates the process. When the number of repetitions has not reached the threshold X, the container deployment controller 156 causes the process to proceed to step S108.

In step S108, the behavior calculator 154 calculates behaviors of the containers and behavior of the servers in an abnormal state. For example, the behavior calculator 154 acquires, from the metric information storage unit 120, metric values of the containers and the servers for the latest predetermined time period and calculates percentile values of multiple percentile types for the containers and the servers. The percentile values calculated for the multiple containers are information indicating behaviors of the containers in the abnormal state. The percentile values calculated for the multiple servers are information indicating the behaviors of the server in the abnormal state.

In step S109, the abnormal factor estimator 155 calculates, for each of the metric types, differences between behaviors of containers for executing components to be used to provide the service of which the performance is to be adjusted in the normal state and behaviors of the containers for executing the components in the abnormal state. For example, the abnormal factor estimator 155 acquires weighted percentile values from the normal-state behavior storage unit 130. Then, the abnormal factor estimator 155 compares weighted percentile values indicating the behaviors in the normal state with weighted percentile values indicating the behaviors calculated in step S108 in the abnormal state and calculates positive factor degrees and negative factor degrees for the metric types.

In step S110, the abnormal factor estimator 155 executes a process of estimating a factor component based on the results of the calculation of step S109. The process of estimating a factor component is described later in detail (refer to FIG. 23).

In step S111, the abnormal factor estimator 155 determines whether or not a factor component has been estimated. When the factor component has been estimated, the abnormal factor estimator 155 causes the process to proceed to step S112. When the factor component has not been estimated, the abnormal factor estimator 155 causes the process to proceed to step S113.

In step S112, the container deployment controller 156 executes the scale out on the factor component. In this case, the container deployment controller 156 adds a container for executing the factor component to any of the servers. For example, the container deployment controller 156 deploys the container in a server that has the maximum available resource amount after the deployment among servers in which the container is able to be deployed. After that, the container deployment controller 156 causes the process to proceed to step S115.

In step S113, the container deployment controller 156 determines whether or not the server factor degree code of the maximum factor degree component is "positive". When the server factor degree code is "positive", the container deployment controller 156 causes the process to proceed to step S114. When the server factor degree code is "negative", the container deployment controller 156 does not execute the performance adjustment and terminates the process.

In step S114, the container deployment controller 156 changes the deployment of a container. In this case, the container deployment controller 156 changes a deployment destination of the container with the maximum factor degree from the current server to another server.

In step S115, the performance adjustment engine 150 increments, by 1, the value of the variable R indicating the number of repetitions and causes the process to proceed to step S102.

Next, the process of estimating a factor component is described in detail.

Figure 23:
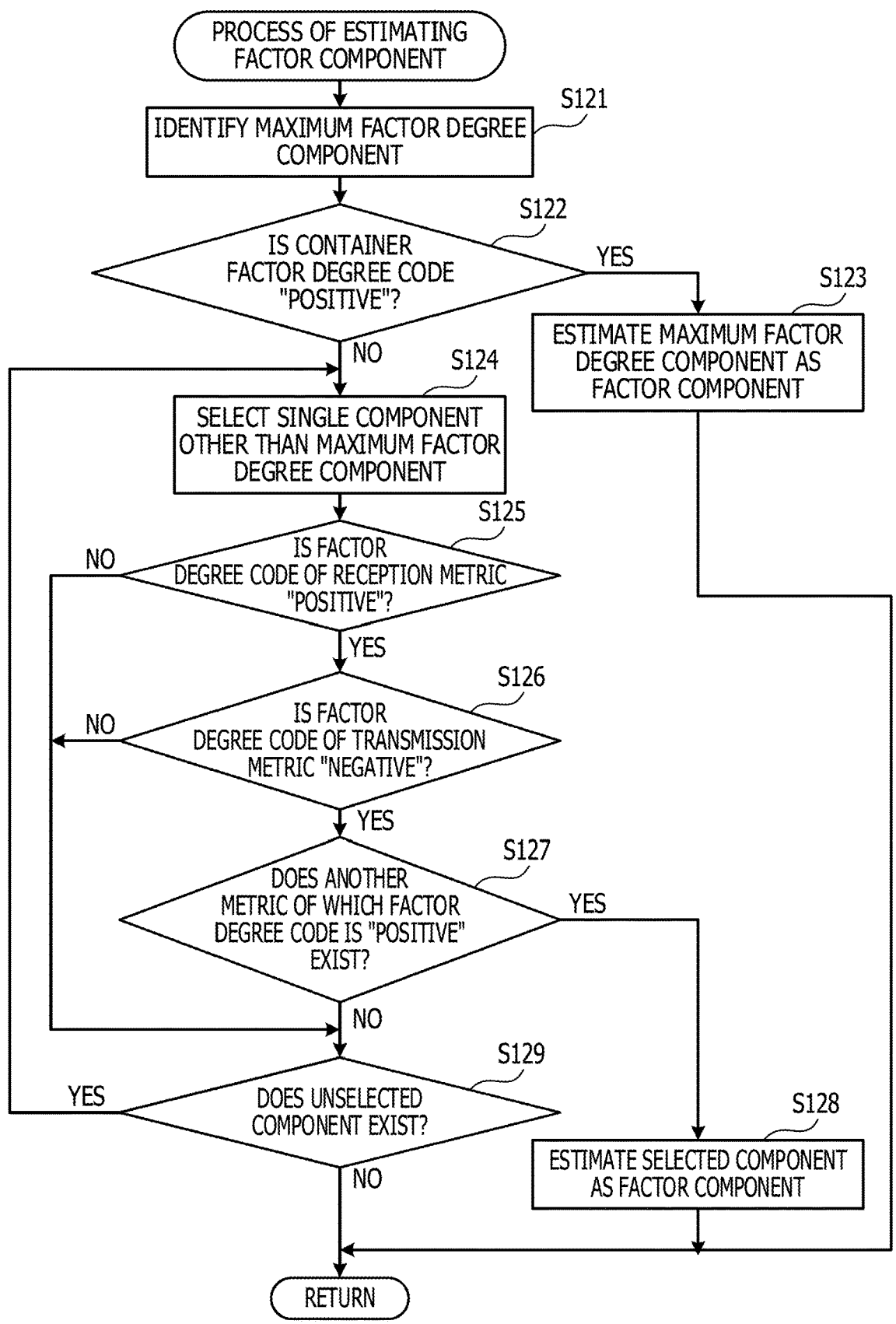
FIG. 23 is a flowchart of an example of a procedure for a process of estimating a factor component.

FIG. 23 is a flowchart of an example of a procedure for a process of estimating a factor component. The process illustrated in FIG. 23 is described using steps.

In step S121, the abnormal factor estimator 155 identifies a maximum factor degree component. For example, the abnormal factor estimator 155 identifies a container from which the maximum positive or negative factor degree has been calculated. Then, the abnormal factor estimator 155 identifies, as the maximum factor degree component, a component of which a process is executed by the identified container.

In step S122, the abnormal factor estimator 155 determines whether or not the container factor degree code is "positive". When the container factor degree code is "positive", the abnormal factor estimator 155 causes the process to proceed to step S123. When the container factor degree code is "negative", the abnormal factor estimator 155 causes the process to proceed to step S124.

In step S123, the abnormal factor estimator 155 estimates the maximum factor degree component as the factor component and terminates the process of estimating a factor component.

In step S124, the abnormal factor estimator 155 selects a single unselected component from among components other than the maximum factor degree component.

In step S125, the abnormal factor estimator 155 determines whether or not a factor degree code of a reception metric (network reception rate) of the selected component is "positive". When the total of positive factor degrees of network reception rates of containers of the selected component is larger than the total of negative factor degrees of the network reception rates of the containers of the selected component, the abnormal factor estimator 155 determines that the factor degree of the reception metric is "positive". When the factor degree code of the reception metric is "positive", the abnormal factor estimator 155 causes the process to proceed to step S126. When the factor degree code of the reception metric is not "positive", the abnormal factor estimator 155 causes the process to proceed to step S129.

In step S126, the abnormal factor estimator 155 determines whether or not a factor degree code of a transmission metric (network transmission rate) of the selected component is "negative". When the total of negative factor degrees of network transmission rates of the containers of the selected component is larger than the total of positive factor degrees of the network transmission rates of the containers of the selected component, the abnormal factor estimator 155 determines that the factor degree code of the transmission metric is "negative". When the factor degree code of the transmission metric is "negative", the abnormal factor estimator 155 causes the process to proceed to step S127. When the factor degree code of the transmission metric is not "negative", the abnormal factor estimator 155 causes the process to proceed to step S129.

In step S127, the abnormal factor estimator 155 determines whether or not one or more metrics of which factor degree codes are "positive" exist among metrics other than the transmission metric and reception metric of the selected component. For example, the abnormal factor estimator 155 sums positive and negative factor degrees of the containers of the selected component for each metric type. Then, the abnormal factor estimator 155 determines that a factor degree code of a metric of which a total value of positive factor degrees is larger than a total value of negative factor degrees of the metric is "positive". When the one or more metrics of which the factor degree codes are "positive" exist, the abnormal factor estimator 155 causes the process to proceed to step S128. When the one or more metrics of which the factor degree codes are "positive" do not exist, the abnormal factor estimator 155 causes the process to proceed to step S129.

In step S128, the abnormal factor estimator 155 estimates the selected component as the factor component and terminates the process of estimating a factor component.

In step S129, the abnormal factor estimator 155 determines whether or not an unselected component exists. When the unselected component exists, the abnormal factor estimator 155 causes the process to proceed to step S124. When all components are already selected, the abnormal factor estimator 155 determines that the factor component is not estimated, and the abnormal factor estimator 155 terminates the process of estimating a factor component.

In the second embodiment, a component that causes an increase in the latency is determined based on behaviors of containers in the normal state and behaviors of the containers in an abnormal state. Thus, the component that causes the increase in the latency may be appropriately determined. For example, when a metric value of a certain container significantly decreases to a value lower than that in the normal state, a process of a component other than a component of which a process is executed by the certain container may slow down. Even in this case, the managing server 100 may accurately determine the component causing a decrease in the performance by finding the component of which the process slows down due to an overload.

In the second embodiment, even in the case where a performance requirement is not defined for each component, when performance of a component is insufficient, a function of the component is automatically expanded. As a result, the cost of managing the operation of the system is reduced. The cost of developing components is reduced by automatically adjusting the performance of the components without consideration of achieved performance of the components upon the development of the components.

In the second embodiment, a state indicated by frequency distributions of metrics is replaced with relatively simple numerical values by calculating percentile values from the frequency distributions of the metrics. Thus, differences between behaviors in the normal state and behaviors in an abnormal state may be quantified and a container in which the difference between a behavior in the normal state and a behavior in an abnormal state is the largest may be easily identified from multiple containers.

In the second embodiment, a recent state is strongly reflected in the normal state using weighted percentile values. Thus, behaviors in the normal state may be accurately calculated. For example, in the cloud computing system, the system configuration is frequently changed by the addition of a server, the addition of software, and the like. Thus, behaviors of containers and servers in a distant past normal state may be significantly different from behaviors of the containers and the servers in a recent normal state. In addition, when behaviors in a recent short time period are treated as behaviors in the normal state, a special factor (for example, a server failure) that has temporarily occurred may be reflected in the behaviors, and the accuracy of the behaviors in the normal state may be low. Thus, the performance adjustment engine 150 reflects strongly behaviors in a recent normal state in behaviors in the normal state and calculates the behaviors in the normal state based on behaviors in a relatively long time period. As a result, the accuracy of the behaviors in the normal state is improved.

A component that causes a decrease in the performance may not be identified. In this case, the performance adjustment engine 150 changes the deployment of a container and migrates the container from a server having a certain problem to another server so that the container appropriately achieves performance. Thus, excessive consumption of a resource due to useless scale out may be suppressed.

Other Embodiments

In the second embodiment, the percentile values are used as representative values of metric information of the resources, but other representative values such as average values or medians may be used.

Although the embodiments are described, the configurations of the units described in the embodiments may be replaced with other units having the same functions as the units described in the embodiments. In addition, another arbitrary constituent section and another arbitrary process may be added. Furthermore, arbitrary two or more of the configurations (features) described in the embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A performance evaluation method implemented by a computer, the performance evaluation method comprising:
  acquiring, by a processor circuitry of the computer, performance information indicating performance of a service, the service being provided by causing a plurality of software components to coordinate with each other;
  acquiring, by the processor circuitry of the computer, a determination result indicating whether the performance information satisfies a performance requirement by comparing a value included in the performance information with the performance requirement, the performance requirement indicating performance requested for the service;
  acquiring, by the processor circuitry of the computer, a plurality of measurement values for at least any one of the plurality of software components in response to the determination result indicating that the performance information does not satisfy the performance requirement, the plurality of measurement values including a first latest load value, a second latest load value, and a third latest load value, the first latest load value indicating a data reception load of each of the at least any one of the plurality of software components in a latest predetermined time period, the second latest load value indicating a data transmission load of each of the at least any one of the plurality of software components in the latest predetermined time period, the third latest load value indicating a process load, applied due to received data, of each of the at least any one of the plurality of software components in the latest predetermined time period;
  acquiring, by the processor circuitry of the computer, a plurality of normal load values for the at least any one of the plurality of software components from a memory, the plurality of normal load values including a first normal load value, a second normal load value, and a third normal load value, the first normal load value indicating a data reception load during a time period when the performance of the service satisfies the performance requirement, the second normal load value indicating a data transmission load during the time period, the third normal load value indicating a process load applied due to received data during the time period; and
  outputting, in response to the plurality of measurement values matching a condition, information on the at least any one of the plurality of software components as a factor causing a decrease in the performance of the service, the condition being configured to be matched when the first latest load value is larger than the first normal load value, the second latest load value is smaller than the second normal load value, and the third latest load value is larger than the third normal load value.

2. The performance evaluation method according to claim 1, wherein the outputting is configured to
  determine a maximum load difference component from among the plurality of software components, the maximum load difference component being a software component in which the difference between a latest process load and a process load in a normal state is the largest among the plurality of software components, and
  output, as the factor, the information on the at least any one of the plurality of software components when the load of the maximum load difference component in the normal state is larger than the latest load of the maximum load difference component.

3. The performance evaluation method according to claim 2, wherein the outputting is configured to output, as the factor causing the decrease in the performance of the service, information on the maximum load difference component when the latest load of the maximum load difference component is larger than the load of the maximum load difference component in the normal state.

4. The performance evaluation method according to claim 2, wherein the outputting is configured to output information on a first server as the factor causing the decrease in the performance of the service when both a first condition and a second condition are satisfied, the first condition being configured to be satisfied when the load of the maximum load difference component in the normal state is larger than the latest load of the maximum load difference component upon the plurality of measurement values matching the condition do not exist, the second condition being configured to be satisfied when a load of a server executing the maximum load difference component upon the performance of the service does not satisfy the performance requirement is larger than a load of the server executing the maximum load difference component upon the performance of the service satisfies the performance requirement.

5. An apparatus for performance evaluation, the apparatus comprising:
  a memory; and
  a processor coupled to the memory, the processor being configured to execute processing that includes:
    acquiring performance information indicating performance of a service, the service being provided by causing a plurality of software components to coordinate with each other;
    acquiring, by the processor circuitry of the computer, a determination result indicating whether the performance information satisfies a performance requirement by comparing a value included in the performance information with the performance requirement, the performance requirement indicating performance requested for the service;
    acquiring a plurality of measurement values for at least any one of the plurality of software components in response to the determination result indicating that the performance information does not satisfy the performance requirement, the plurality of measurement values including a first latest load value, a second latest load value, and a third latest load value, the first latest load value indicating a data reception load of each of the at least any one of the plurality of software components in a latest predetermined time period, the second latest load value indicating a data transmission load of each of the at least any one of the plurality of software components in the latest predetermined time period, the third latest load value indicating a process loath load, applied due to received data, of the multiple processes each of the at least any one of the plurality of software components in the latest predetermined time period;
    acquiring a plurality of normal load values for the at least any one of the plurality of software components from a memory, the plurality of normal load values including a first normal load value, a second normal load value, and a third normal load value, the first normal load value indicating a data reception load during a time period when the performance of the service satisfies the performance requirement, the second normal load value indicating a data transmission load during the time period, the third normal load value indicating a process load applied due to received data during the time period; and
    outputting, in response to the plurality of measurement values matching a condition, information on the at least any one of the plurality of software components as a factor causing a decrease in the performance of the service, the condition being configured to be matched when the first latest load value is larger than the first normal load value, the second latest load value is smaller than the second normal load value, and the third latest load value is larger than the third normal load value.

6. The apparatus according to claim 5, wherein the outputting is configured to
  determine a maximum load difference component from among the plurality of software components, the maximum load difference component being a software component in which the difference between a latest process load and a process load in a normal state is the largest among the plurality of software components, and
  output, as the factor, the information on the at least any one of the plurality of software components when the load of the maximum load difference component in the normal state is larger than the latest load of the maximum load difference component.

7. The apparatus according to claim 5, wherein the outputting is configured to output, as the factor causing the decrease in the performance of the service, information on the maximum load difference component is output when the latest load of the maximum load difference component is larger than the load of the maximum load difference component in the normal state.

8. The apparatus according to claim 6, wherein the outputting is configured to output information on a first server as the factor causing the decrease in the performance of the service when both a first condition and a second condition are satisfied, the first condition being configured to be satisfied when the load of the maximum load difference component in the normal state is larger than the latest load of the maximum load difference component upon the plurality of measurement values matching the condition do not exist, and the second condition being configured to be satisfied when a load of a server executing the maximum load difference component upon the performance of the service does not satisfy the performance requirement is larger than a load of the server executing the maximum load difference component upon the performance of the service satisfies the performance requirement.

9. A non-transitory computer-readable storage medium for storing a program which causes a processor to perform processing for performance evaluation, the processing comprising:
  acquiring performance information indicating performance of a service, the service being provided by causing a plurality of software components to coordinate with each other;
  acquiring, by the processor circuitry of the computer, a determination result indicating whether the performance information satisfies a performance requirement by comparing a value included in the performance information with the performance requirement, the performance requirement indicating performance requested for the service;
  acquiring a plurality of measurement values for at least any one of the plurality of software components in response to the determination result indicating that the performance information does not satisfy the performance requirement, the plurality of measurement values including a first latest load value, a second latest load value, and a third latest load value, the first latest load value indicating a data reception loads of each of the at least any one of the plurality of software components in a latest predetermined time period, the second latest load value indicating a data transmission load of each of the at least any one of the plurality of
software components in the latest predetermined time
period, the third latest load value indicating a process
load, applied due to received data, of each of the at least
any one of the plurality of software components in the
latest predetermined time period;

acquiring a plurality of normal load values for the at least
any one of the plurality of software components from
a memory, the plurality of normal load values including
a first normal load value, a second normal load value,
and a third normal load value, the first normal load
value indicating a data reception load during a time
period when the performance of the service satisfies the
performance requirement, the second normal load
value indicating a data transmission load during the
time period, the third normal load value indicating a
process load applied due to received data during the
time period; and outputting, in response to the plurality of measurement
values matching a condition, information on the at least
any one of the plurality of software components as a
factor causing a decrease in the performance of the
service, the condition being configured to be matched
when the first latest load value is larger than the first
normal load value, the second latest load value is
smaller than the second normal load value, and the third
latest load value is larger than the third normal load
value.

10. The non-transitory computer-readable storage medium according to claim 9, wherein the outputting is configured to
determine a maximum load difference component from among the plurality of software components, the maximum load difference component being a software component in which the difference between a latest process load and a process load in a normal state is the largest among the plurality of software components, and
output, as the factor, the information on the at least any one of the plurality of software components when the load of the maximum load difference component in the normal state is larger than the latest load of the maximum load difference component.

11. The non-transitory computer-readable storage medium according to claim 10, wherein the outputting is configured to output, as the factor causing the decrease in the performance of the service, information on the maximum load difference component is output when the latest load of the maximum load difference component is larger than the load of the maximum load difference component in the normal state.

12. The non-transitory computer-readable storage medium according to claim 10, wherein the outputting is configured to output information on a first server as the factor causing the decrease in the performance of the service when both a first condition and a second condition are satisfied, the first condition being configured to be satisfied when the load of the maximum load difference component in the normal state is larger than the latest load of the maximum load difference component upon the plurality of measurement values matching the condition do not exist, and the second condition being configured to be satisfied when a load of a server executing the maximum load difference component upon the performance of the service does not satisfy the performance requirement is larger than a load of the server executing the maximum load difference component upon the performance of the service satisfies the performance requirement.

* * * * *